(12) United States Patent
Herr et al.

(10) Patent No.: US 11,036,477 B2
(45) Date of Patent: Jun. 15, 2021

(54) METHODS AND APPARATUS TO IMPROVE UTILIZATION OF A HETEROGENEOUS SYSTEM EXECUTING SOFTWARE

(71) Applicant: Intel Corporation, Santa Clara, CA (US)

(72) Inventors: Adam Herr, Forest Grove, OR (US); Sridhar Sharma, Palo Alto, CA (US); Mikael Bourges-Sevenier, Santa Clara, CA (US); Justin Gottschlich, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/455,628

(22) Filed: Jun. 27, 2019

(65) Prior Publication Data

US 2019/0317741 A1   Oct. 17, 2019

(51) Int. Cl.
*G06F 8/41* (2018.01)
*G06N 3/08* (2006.01)
*G06F 9/48* (2006.01)

(52) U.S. Cl.
CPC .............. *G06F 8/41* (2013.01); *G06N 3/08* (2013.01); *G06F 9/48* (2013.01)

(58) Field of Classification Search
CPC ..................................... G06F 8/41; G06N 3/08
See application file for complete search history.

(56) References Cited

U.S. PATENT DOCUMENTS

| | | | |
|---|---|---|---|
| 9,483,282 | B1 | 11/2016 | Vandervennet et al. |
| 9,800,466 | B1 | 10/2017 | Rangole |
| 10,007,520 | B1 | 6/2018 | Ross |
| 10,187,252 | B2 | 1/2019 | Byers et al. |
| 10,445,118 | B2 | 10/2019 | Guo et al. |
| 10,713,213 | B2 | 7/2020 | Tamir et al. |

(Continued)

OTHER PUBLICATIONS

Sami Lazreg et al., Multifaceted Automated Analyses for Variability-Intensive Embedded Systems, IEEE, 2019, retrieved online on Jan. 27, 2021, pp. 854-865. Retrieved from the Internet <URL: https://ieeexplore.ieee.org/stamp/stamp.jsp?tp=&arnumber=8812057>. (Year: 2019).*

(Continued)

*Primary Examiner* — Hanh Thi-Minh Bui
(74) *Attorney, Agent, or Firm* — Hanley, Flight & Zimmerman, LLC

(57) ABSTRACT

Methods, apparatus, systems and articles of manufacture are disclosed improve utilization of a heterogeneous system executing software. The disclosed methods, apparatus, systems and articles of manufacture include an apparatus comprising a variant manager to determine whether an algorithm is a candidate for sub-algorithmic partitioning (SAP) based on at least one of a first size of input data to the algorithm and a second size of output data from the algorithm; a partitioner to partition the algorithm into at least a first tile and a second tile; and a compiler to compile a first variant based on the first tile and a second variant based on the second tile into an executable file, the first variant to be executed on a first processing element of the heterogeneous system, the second variant to be executed on a second processing element of the heterogeneous system.

32 Claims, 9 Drawing Sheets

(56) References Cited

U.S. PATENT DOCUMENTS

| | | |
|---|---|---|
| 10,908,884 B2 | 2/2021 | Herr et al. |
| 2009/0158248 A1 | 6/2009 | Linderman et al. |
| 2010/0153934 A1* | 6/2010 | Lachner .............. G06F 9/30181 717/146 |
| 2011/0289519 A1 | 11/2011 | Frost |
| 2013/0212365 A1 | 8/2013 | Chen et al. |
| 2016/0210174 A1 | 7/2016 | Hsieh et al. |
| 2016/0350088 A1 | 12/2016 | Ravishankar et al. |
| 2018/0082212 A1 | 3/2018 | Faivishevsky et al. |
| 2018/0173675 A1 | 6/2018 | Tamir et al. |
| 2018/0183660 A1 | 6/2018 | Byers et al. |
| 2019/0317740 A1 | 10/2019 | Herr et al. |
| 2019/0317880 A1 | 10/2019 | Herr et al. |
| 2019/0324755 A1 | 10/2019 | Herr et al. |

OTHER PUBLICATIONS

"SYCL: C++ Single-source Heterogeneous Programming for OpenCL," Khronos, [Online]. last retrieved Jul. 10, 2019, Available: https://www.khronos.org/sycl/, May 26, 2015, 7 pages.

Chen et al., "Learning to Optimize Tensor Programs," 32nd Conference on Neural Information Processing Systems (NeurIPS 2018), Montréal, Canada, May 21, 2018, 12 pages.

Chen et al., "TVM: An Automated End-to-End Optimizing Compiler for Deep Learning," in SysML 2018, Palo Alto, Feb. 12, 2018, 17 pages.

Ragan-Kelley, "Decoupling Algorithms from the Organization of Computation for High Performance Image Processing: The design and implementation of the Halide language and compiler," MIT, Cambridge, MA, Jun. 2014, 187 pages.

Ragan-Kelley, "Decoupling Algorithms from the Organization of Computation for High Performance Image Processing: The design and implementation of the Halide language and compiler," MIT PhD Thesis, Jun. 2014, 195 pages.

Ragan-Kelley, "Halide," [Online]. last retrieved Jul. 10, 2019, Available: http://halide-lang.org/, Aug. 4, 2012, 3 pages.

Ragan-Kelley et al., "Halide: a language and compiler for optimizing parallelism, locality, and recomputation in image processing pipelines," PLDI Seattle, Jun. 16-21, 2013, 12 pages.

Adams et al., "Learning to Optimize Halide with Tree Search and Random Programs," ACM Trans. Graph., vol. 38, No. 4, pp. 121:1-121:12, Jul. 2019, 12 pages.

Ahmad, M. and Cheung, A., "Metalift," [Online]. Last retrieved Jul. 10, 2019, Available: http://metalift.uwplse.org/., Oct. 9, 2017, 4 pages.

Nickolls et al., "Scalable Parallel Programming with CUDA," ACM Queue—GPU Computing, vol. 6, No. 2, pp. 40-53 , 2008.I. Buck, M. Garland and K. Skadron, "Scalable Parallel Programming with CUDA," ACM Queue—GPU Computing, vol. 6, No. 2, pp. 40-53, Apr. 28, 2008, 19 pages.

Dagum et al., "OpenMP: An Industry-Standard API for Shared-Memory Programming," IEEE Computational Science & Engineering, vol. 5, No. 1, pp. 46-55, Jan.-Mar. 1998, 10 pages.

Ansel et al., "OpenTuner: An Extensible Framework for Program Autotuning," Computer Science and Artificial Intelligence Laboratory Technical Report, MIT, Cambridge, Nov. 1, 2013, 15 pages.

Ahmad et al., "Automatically Translating Image processing Libraries to Halide," ACM Trans. Graph., vol. 38, No. 6, pp. 204:2-204:13, Jul. 2016, Last retrieved Oct. 2, 2019.

Mullapudi et al., "Automatically Scheduling Halide Image Processing Pipelines," SIGGRAPH, Anaheim, Jul. 24-28, 2016, 11 pages.

Munshi et al., "OPENCL Programming Guide," Addison-Wesley Professional, Upper Saddle River, Jul. 2011, 120 pages.

Van De Geijn et al., "SUMMA: Scalable Universal Matrix Multiplication Algorithm," University of Texas at Austin, Austin, 1995, 19 pages.

The Khronos Group, "OpenCL Specification," Nov. 14, 2012, version 1.2, 380 pages.

The Khronos Group, "Vulkan 1.1 API Specification." Khronos, [Online]. last retrieved Sep. 25, 2019, Available: https://www.khronos.org/registry/vulkan/, Mar. 2018, 15 pages.

Kamil et al., "Verified Lifting of Stencil Computations," PLDI, Santa Barbara, pp. 711-726, Jun. 13-17, 2016, 16 pages.

Greskamp et al., "A Virtual Machine for Merit-Based Runtime Reconfiguration," Proceedings of the 13th Annual IEEE Symposium on Field-Programmable Custom Computing Machines, Apr. 18, 2005, 2 pages.

Altera, "FPGA Run-Time Reconfiguration: Two Approaches," Mar. 2008, ver. 1.0, 6 pages.

Intel, "Intel® FPGA SDK for OpenCL Best Practices Guide," May 8, 2017, 135 pages.

Bergeron et al., "Hardware JIT compilation for off-the-shelf dynamically reconfigurable FPGAs," DIRO, Universite de Montreal GRM, Ecole Polytechnique de Montreal, Budapest, Hungary, Mar. 29-Apr. 6, 2008 , 16 pages.

Altera, "Machines Ensuring the Right Path," retrieved on Sep. 22, 2017, 4 pages.

Greaves, "Distributing C# Methods and Threads over Ethernet-connected FPGAs using Kiwi," 2011, retrieved on Sep. 22, 2017, 13 pages.

IBM Reasearch, "Liquid Metal," retrieved on Sep. 22, 2017, http://researcher.watson.ibm.com/researcher/view_group.php?id=122, Jun. 21, 2014, 4 pages.

Cray X1TM System, "Optimizing Processor-bound Code," http://docs.cray.com/books/S-2315-52/html-S-2315-52/z1073673157.html, Apr. 17, 2006, 12 pages, retrieved on Sep. 22, 2017.

Raman et al., "Parcae: A System for Flexible Parallel Execution," Jun. 2012, 20 pages.

Huang et al., "Programming and Runtime Support to Blaze FPGA Accelerator Deployment at Datacenter Scale," Oct. 2016, 21 pages.

United States Patent and Trademark Office, "Non-Final Office Action" issued in connection with U.S. Appl. No. 15/713,301, dated Jul. 20, 2018, 10 pages.

United States Patent and Trademark Office, "Final Office Action" issued in connection with U.S. Appl. No. 15/713,301, dated Jan. 28, 2019, 12 pages.

United States Patent and Trademark Office, "Notice of Allowance" issued in connection with U.S. Appl. No. 15/713,301, dated May 23-28, 2019, 7 pages.

Hoffmann et al., "Dynamic Knobs for Responsive Power-Aware Computing," Mar. 2011, 14 pages.

United States Patent and Trademark Office, "Non-Final Office Action" issued in connection with U.S. Appl. No. 16/455,379, dated Apr. 13, 2020, 11 pages.

United States Patent and Trademark Office, "Non-Final Office Action" issued in connection with U.S. Appl. No. 16/455,486, dated Jun. 25, 2020, 16 pages.

United States Patent and Trademark Office, "Notice of Allowance" issued in connection with U.S. Appl. No. 16/455,379, dated Jul. 23, 2020, 10 pages.

European Patent Office, "Extended European Search Report", issued in connection with EP patent application No. 20165699.8, dated Nov. 19, 2020 (13 pages).

P. Balaprakash et al., "Autotuning in High-Performance Computing Applications," in Proceedings of the IEEE, vol. 106, No. 11, pp. 2068-2083, Nov. 2018, doi: 10.1109/JPROC.2018.2841200 (16 pages).

S. Barati et al., "Proteus: Language and Runtime Support for Self-Adaptive Software Development," in IEEE Software, vol. 36, No. 2, pp. 73-82, Mar.-Apr. 2019, doi: 10.1109/MS.2018.2884864 (10 pages).

Alam et al., "A Zero-Positive Learning Approach for Diagnosing Software Performance Regressions," May 31, 2019 (12 pages).

United States Patent and Trademark Office, "Corrected Notice of Allowance" issued in connection with U.S. Appl. No. 16/455,379, dated Aug. 28, 2020, 2 pages.

United States Patent and Trademark Office, "Corrected Notice of Allowance" issued in connection with U.S. Appl. No. 16/455,379, dated Dec. 11, 2020, 2 pages.

(56) References Cited

OTHER PUBLICATIONS

United States Patent and Trademark Office, "Final Office Action" issued in connection with U.S. Appl. No. 16/455,486, dated Dec. 14, 2020, 19 pages.
United States Patent and Trademark Office, "Corrected Notice of Allowance" issued in connection with U.S. Appl. No. 16/455,379, dated Dec. 30, 2020, 5 pages.
United States Patent and Trademark Office, "Non-Final Office Action" issued in connection with U.S. Appl. No. 16/455,388, dated Mar. 3, 2021, 21 pages.
United States Patent and Trademark Office, "Advisory Action" issued in connection with U.S. Appl. No. 16/455,486 dated Mar. 10, 2021, 4 pages.

\* cited by examiner

METHODS AND APPARATUS TO IMPROVE UTILIZATION OF A HETEROGENEOUS SYSTEM EXECUTING SOFTWARE

FIELD OF THE DISCLOSURE

This disclosure relates generally to processing, and, more particularly, to methods and apparatus to improve utilization of a heterogeneous system executing software.

BACKGROUND

Computer hardware manufacturers develop hardware components for use in various components of a computer platform. For example, computer hardware manufacturers develop motherboards, chipsets for motherboards, central processing units (CPUs), batch processors (e.g., processors designed for massively parallel computation of bulk data), graphics processing units (GPUs), vision processing units (VPUs), field programmable gate arrays (FPGAs), hard disk drives (HDDs), solid state drives (SSDs), and other computer components. Many computer hardware manufacturers develop programs and/or other methods to compile algorithms and/or other code to be run on a specific processing platform.

Figure 1:
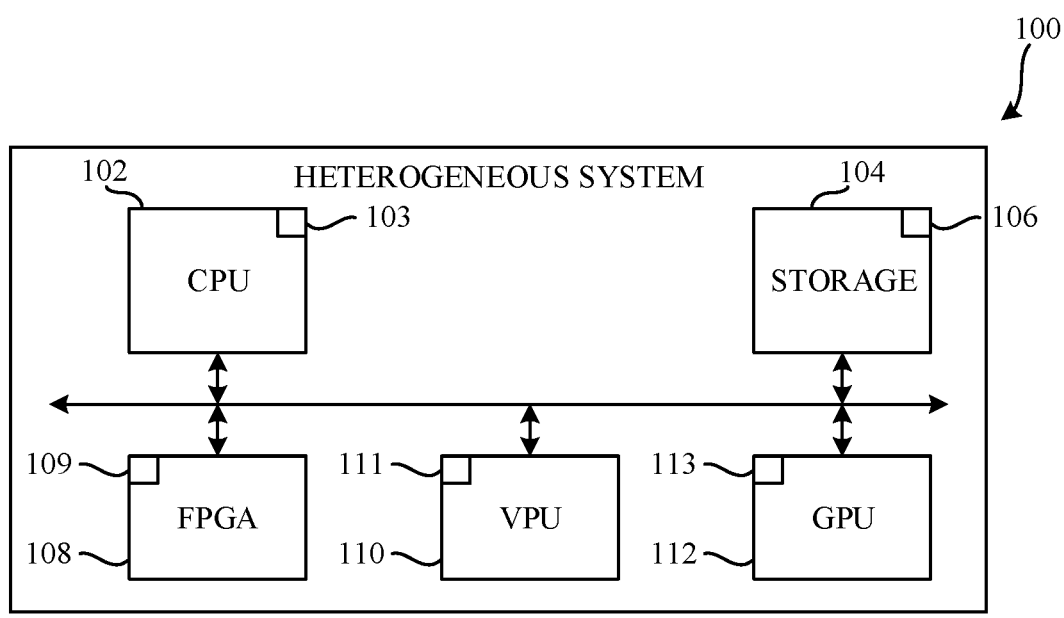
FIG. 1 is a block diagram illustrating an example heterogeneous system.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

As previously mentioned, many computer hardware manufacturers and/or other providers develop programs and/or other methods to compile algorithms and/or other code to be run on a specific processing platform. For example, some computer hardware manufacturers develop programs and/or other methods to compile algorithms and/or other code to be run on a GPU, a VPU, a CPU, or an FPGA. Such programs and/or other methods function using domain specific languages (DSLs). DSLs (e.g., Halide, OpenCL, etc.) utilize the principle of separation of concerns to separate how an algorithm (e.g., a program, a block of code, etc.) is written from how the algorithm is executed. For example, many DSLs allows a developer to represent an algorithm in a high level functional language without worrying about the performant mapping to the underlying hardware and also allows the developer to implement and explore high-level strategies to map the algorithm to the hardware (e.g., by a process called schedule specification).

For example, an algorithm may be defined to blur an image (e.g., how the algorithm is written) and a developer may desire that the algorithm run effectively on a CPU, a VPU, a GPU, and an FPGA. To effectively run the algorithm on the various types of processing elements (e.g., CPU, VPU, GPU, FPGA, a heterogeneous system, etc.), a schedule needs to be generated. The schedule specifies how the algorithm can be transformed in different ways depending on the particular processing element so as to get a performant implementation. Many methods of automating compilation time scheduling of an algorithm have been developed. For example, compilation auto-scheduling, may include auto-tuning, heuristic searching, and hybrid scheduling.

In some situations, an algorithm and/or other code may process a large amount of data. For example, a developer may desire to blur a hundred million by hundred million pixel image. Such an image processing operation may result in a matrix multiplication of one or more hundred million by hundred million matrices. In a typical offload scenario, such an operation may be offloaded to a GPU processing element. However, due to the enormous size of the matrices being processed, the execution of the operation on the GPU will take a substantially long period of time relative to operations executing on the other processing elements of the heterogeneous system. Moreover, if the other processing elements of the heterogeneous system require the output of the image processing operation, the other processing elements will be idle until the GPU finishes the operation.

To avoid this latency is processing speed, an algorithm can be divided into sub-algorithmic fragments. These fragments can be executed on separate processing elements and an overall result can be achieved in less time than an individual processing element executing the composite algorithm. However, this approach requires the programmer to know (a) exactly how to split the algorithm, (b) the intricacies of programming on different processing elements, (c) how to mask offload latencies by writing offload semantics, and (d) how synchronize the different results from different fragments. Even if a programmer understands the nuanced details of sub-algorithmic fragments, an algorithm executed in such a manner can still break down due to unforeseen load and environmental conditions.

Moreover, the decision of where to run an algorithm fragment and when to run the algorithm fragment are generally made at compile time, however, at runtime the load and environmental conditions can cause a predetermined offload plan to be unfavorable. Unless there is an existing alternate sub-algorithmic representation of the algorithm that can be utilized by a runtime scheduler to meet the environmental and load demands, the sub-algorithmic representation that is offloaded will have undesirable performance. Furthermore, hand-coded sub-algorithmic representations of algorithms do not scale well between input data sizes and with heterogeneous systems including more and more unique processing elements, it is untenable to expect programmers to hand-code sub-algorithmic representations of algorithms.

Examples disclosed herein include methods and apparatus to improve utilization of a heterogeneous system executing software. The disclosed examples present a coherent programming model for generating sub-algorithmic representations of algorithms that can be run under a variety of environmental and load conditions. Additionally, the examples disclosed herein facilitate the runtime scheduling of algorithms at the sub-algorithmic granularity, the generation of sub-algorithmic representations of algorithms at compile time, the synchronization of sub-algorithmic processing results, and runtime performance characteristics that inform sub-algorithmic scheduling decisions.

Without sub-algorithmic representations of algorithms, large portions of a heterogeneous system may remain underutilized at runtime. Examples disclosed herein improve utilization of a heterogeneous system executing software. The examples disclosed herein provide an apparatus including a variant manager to determine whether an algorithm is a candidate for sub-algorithmic partitioning (SAP) based on at least one of a first size of input data to the algorithm and a second size of output data from the algorithm; a partitioner to partition the algorithm into at least a first tile and a second tile; and a compiler to compile a first variant based on the first tile and a second variant based on the second tile into an executable file, the first variant to be executed on a first processing element of the heterogeneous system, the second variant to be executed on a second processing element of the heterogeneous system.

FIG. 1 is a block diagram illustrating an example heterogeneous system 100. In the example of FIG. 1, the heterogeneous system 100 includes an example CPU 102, an example storage 104, an example FPGA 108, an example VPU 110, and an example GPU 112. The example CPU 102 includes an example CPU storage 103. The example storage 104 includes an example executable 106. Alternatively, the storage 104 may include more than one executable. The example FPGA 108 includes an FPGA storage 109. The example VPU 110 includes an example VPU storage 111. The example GPU 112 includes an example GPU storage 113. In FIG. 1, the heterogeneous system 100 is a system on a chip (SoC). Alternatively, the heterogeneous system 100 may be any other type of computing or hardware system.

In examples disclosed herein, each of the CPU 102, the storage 104, the FPGA 108, the VPU 110, and the GPU 112 is in communication with the other elements of the heterogeneous system 100. For example, the CPU 102, the storage 104, the FPGA 108, the VPU 110, and the GPU 112 are in communication via a communication bus. In some examples disclosed herein, the CPU 102, the storage 104, the FPGA 108, the VPU 110, and the GPU 112 may be in communication via any suitable wired and/or wireless communication method. Additionally, in some examples disclosed herein, each of the CPU 102, the storage 104, the FPGA 108, the VPU 110, and the GPU 112 may be in communication with any component exterior to the heterogeneous system 100 via any suitable wired and/or wireless communication method.

In the example of FIG. 1, the CPU 102 is a processing element that executes instructions (e.g., machine-readable instruction that are included in and/or otherwise correspond to the executable 106) to execute, perform, and/or facilitate a completion of operations associated with a computer or computing device. In the example of FIG. 1, the CPU 102 is a primary processing element for the heterogeneous system 100 and includes at least one core. Alternatively, the CPU 102 may be a co-primary processing element (e.g., in an example where more than one CPU is utilized) while, in other examples, the CPU 102 may be a secondary processing element.

In the example illustrated in FIG. 1, the storage 104 is a memory including the executable 106. Additionally or alternatively, the executable 106 may be stored in the CPU storage 103, the FPGA storage 109, the VPU storage 111, and/or the GPU storage 113. In FIG. 1, the storage 104 is a shared storage between at least one of the CPU 102, the FPGA 108, the VPU 110, and the GPU 112. In the example of FIG. 1, the storage 104 is a physical storage local to the heterogeneous system 100; however, in other examples, the storage 104 may be external to and/or otherwise be remote with respect to the heterogeneous system 100. In further examples, the storage 104 may be a virtual storage. In the example of FIG. 1, the storage 104 is a persistent storage (e.g., read only memory (ROM), programmable ROM (PROM), erasable PROM (EPROM), electrically erasable PROM (EEPROM), etc.). In other examples, the storage 104 may be a persistent basic input/output system (BIOS) or a flash storage. In further examples, the storage 104 may be a volatile memory.

In the illustrated example of FIG. 1, one or more of the FPGA 108, the VPU 110, and the GPU 112 are processing elements that may be utilized by a program executing on the heterogeneous system 100 for computing tasks, such as hardware acceleration. For example, the FPGA 108 is a versatile programmable processing element that can be used for a computable operation or process. In other examples, the VPU 110 is a processing element that includes processing resources that are designed and/or otherwise configured or structured to improve the processing speed and overall performance of processing machine vision tasks for AI. In yet other examples, the GPU 112 is a processing element that is designed to improve the processing speed and overall performance of processing computer graphics and/or image processing. While the FPGA 108, the VPU 110, and GPU 112 include functionality to support specific processing tasks, one or more of the FPGA 108, the VPU 110, and/or the GPU 112 can correspond to a processing elements that support general processing tasks that may be offloaded from the CPU 102 on an as needed basis. Additionally, one or more of the FPGA 108, the VPU 110, and/or the GPU 112 may store the results of an executed computation locally on the FPGA storage 109, the VPU storage 111, and/or the GPU storage 113, respectively.

While the heterogeneous system 100 of FIG. 1 includes the CPU 102, the storage 104, the FPGA 108, the VPU 110, and the GPU 112, in some examples, the heterogeneous system 100 may include any number of processing elements including application-specific instruction set processors (ASIPs), physic processing units (PPUs), digital signal processors (DSPs), image processors, coprocessors, floating-point units, network processors, multi-core processors, and front-end processors.

Figure 2:
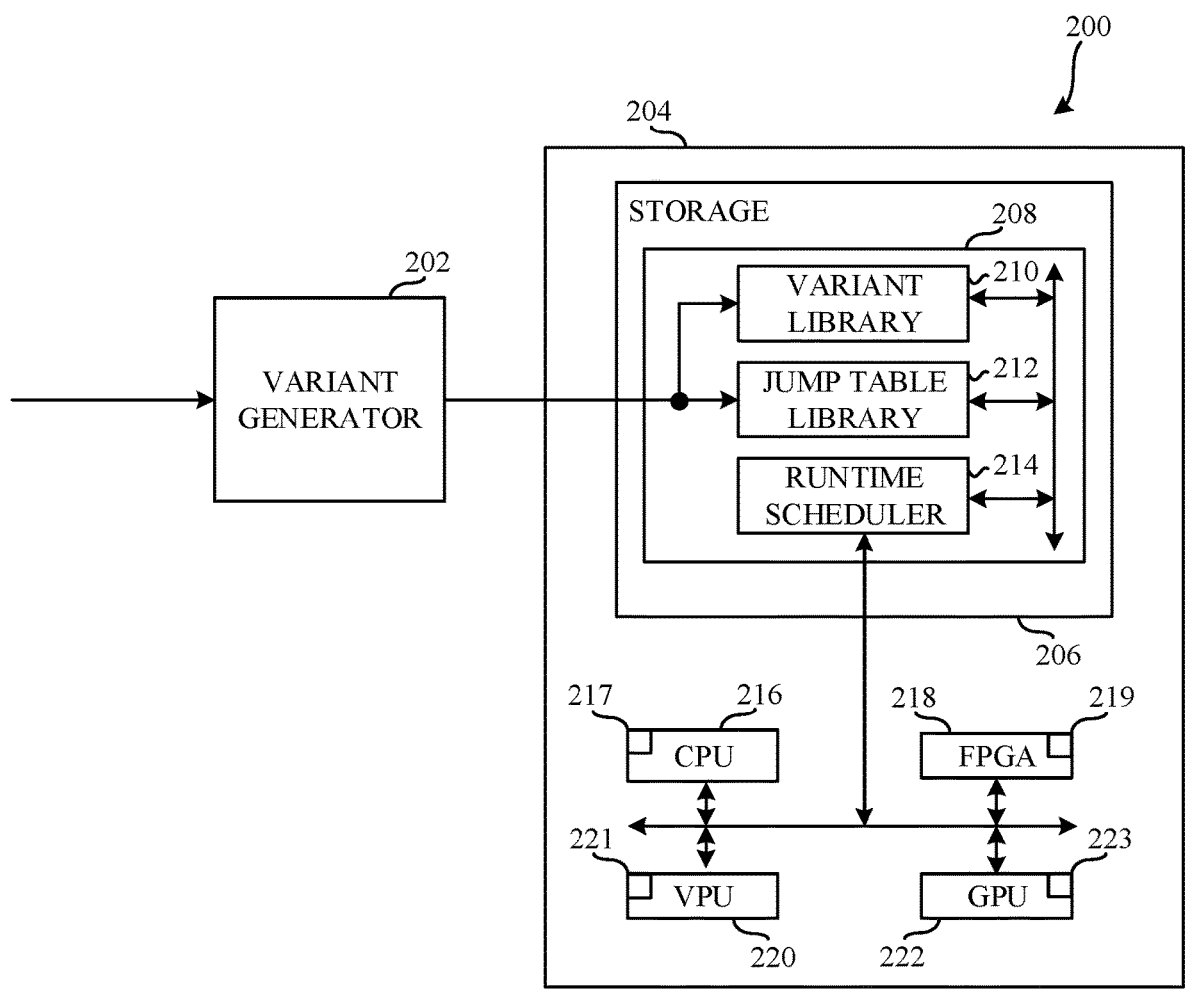
FIG. 2 is a block diagram illustrating an example software adjustment system.

FIG. 2 is a block diagram illustrating an example software adjustment system 200. The example software adjustment system 200 includes an example variant generator 202 and an example heterogeneous system 204. The heterogeneous system includes an example storage 206 including an example executable 208. The example executable 208 includes an example variant library 210, an example jump table library 212, and an example runtime scheduler 214. The example heterogeneous system 204 additionally includes an example CPU 216, an example FPGA 218, an example VPU 220, and an example GPU 222. Each of the example CPU 216, the example FPGA 218, the example VPU 220, and the example GPU 222 includes an example CPU storage 217, an example FPGA storage 219, an example VPU storage 221, and an example GPU storage 223, respectively.

In the example of FIG. 2, the example heterogeneous system 204 is similar to the heterogeneous system 100 of FIG. 1 where the storage 206 is internal to the heterogeneous system 204. However, in other examples, the storage 206 may be external to the heterogeneous system 204. In the example illustrated in FIG. 2, the variant generator 202 may be located at a remote facility (e.g., remote with respect to the heterogeneous system 204, a developer's compilation system, etc.) and the variant generator 202 may be a cluster of computers (e.g., a server room).

In the illustrated example of FIG. 2, the variant generator 202 is coupled to one or more external devices, the storage 206, the variant library 210, and the jump table library 212. In FIG. 2, the variant generator 202 is a device that compiles algorithms received from an external device into an executable application including a number of variants of sub-algorithmic fragments of the algorithms. For example, if the algorithms received from an external device are written in C/C++, the variant generator 202 compiles the algorithms into executable applications for storage in the storage 206. In examples disclosed herein, the executable applications compiled by variant generator 202 are fat binaries. However, in other examples, the executable application compiled by the variant generator 202 may be any suitable executable file.

In the example of FIG. 2, the variant generator 202 obtains one or more algorithms from a device such as an external device and/or a code developer's workstation. In the examples disclosed herein, the algorithms are written using a separation of concern DSL, such as Halide, which facilitates computations that are carried out along a regular grid. Regular grid DSLs like Halide allow for ease of SAP; however, non-regular grids can also be used by accounting for the seams of an algorithm (e.g., the natural breaking points between different portions of an algorithm). Regardless of the partitioning grid used, the variant generator 202 determines the processing elements of a target heterogeneous system for which the algorithm has been written. After determining the processing elements of the target heterogeneous system, the variant generator 202 determines whether each algorithm received is a candidate for partitioning.

In the example of FIG. 2, the variant generator 202 determines whether an algorithm is a candidate for sub-algorithmic partitioning (SAP) by analyzing the size of the input data to an algorithm and the size of the output data from the algorithm. The variant generator 202 determines whether the size of the algorithm inputs and outputs justifies the associated latencies of moving the workload from one processing element to multiple processing for which the SAP variants have been compiled.

In the example illustrated in FIG. 2, to determine the size of the algorithm inputs and outputs, the variant generator 202 analyzes the buffer bounds for the algorithm. As the bound buffers are associated with the size of the input and output data of the algorithm, the variant generator 202 can infer the size of the input and output data of the algorithm by analyzing the buffer bounds. If the size of the algorithm inputs and outputs is sufficiently high enough (e.g., if the time to execute the algorithm is larger than the time to move the SAP variants to their respective processing elements), the variant generator 202 may determine that the algorithm is a candidate for partitioning (e.g., a viable program to be partitioned).

In the illustrated example of FIG. 2, if the algorithm does not include bound buffers and/or the bounds of the inputs and outputs of the algorithm are not otherwise defined, the variant generator 202 may additionally determine whether an algorithm is a candidate for partitioning based on additional information (e.g., information from a developer). Thus, the variant generator 202 determines if the algorithm is a candidate for partitioning based on a threshold size of the input data and/or the output data. For example, if the size of the input data and/or the size of the output data meets a threshold value (e.g., is greater than a threshold amount), the variant generator 202 determines that the algorithm is a candidate for partitioning.

In the example of FIG. 2, if an algorithm is a candidate for partitioning, the variant generator 202 selects a partitioning strategy. The variant generator 202 selects a partitioning strategy based on a type of the algorithm, the size of the inputs and the size of the outputs of the algorithm, and the processing elements of the target system. For example, if the algorithm includes larger matrix multiplication, the variant generator 202 may select to partition the algorithm into parallel matric multiplication partitions, such as one or more scalable universal matric multiplication algorithms (SUM-MAs). Additionally, for example, if the target heterogeneous system includes a CPU and a GPU, the variant generator 202 may select a partitioning strategy for the algorithm that partitions the algorithm into two fragments, one that is very large in relation to the other. There are a variety of partitioning strategies to select from, some of which will be explained further in FIGS. 5A-5E. In order to select the partitioning strategy, the examples disclosed herein utilize machine learning (ML)/artificial intelligence (AI) techniques. Although the examples disclosed herein select the partitioning strategy and/or partitioning strategies based on ML/AI techniques, other examples may select the partitioning strategy and/or partitioning strategies based on auto-tuning, heuristic searching, and/or hand-tuning.

Auto-tuning includes fitting a range of workable partition sizes for each processing element of a heterogeneous system and compiling the algorithm, executing the algorithm, measuring the performance of the processing element and/or processing elements, and repeating the process until a threshold of performance has been met (e.g., power consumption, speed of execution, etc.). However, in order to achieve a desired threshold of performance, an extensive compilation time may be required, and the compilation time is compounded as the complexity of the algorithm increases.

Heuristic searching includes (1) applying rules that define types of algorithm transformations that will improve the performance to meet a performance threshold, and (2) applying rules that define types of algorithm transformations that will not improve the performance to meet the performance threshold. Then, based on the rules, a search space can be defined and searched based on a cost model. The cost model, however, is generally specific to a particular processing element. Complex modern hardware (e.g., one or more processing elements) is difficult to model empirically and typically only hardware accelerators are modeled. Similarly, the cost model is difficult to use for an arbitrary algorithm. For example, cost models work for simple pre-determined conditions, but for complex and stochastic conditions cost models generally fail.

Hybrid scheduling includes utilizing AI to identify a cost model for a generic processing element. The cost model can correspond to representing, predicting, and/or otherwise determining computation costs of one or more processing elements to execute a portion of code to facilitate processing of one or more workloads. For example, artificial intelligence including ML, deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. Some types of machine learning models include, for example, a support vector machine (SVM), a neural network (NN), a recurrent neural network (RNN), a convolutional neural network (CNN), a long short term memory (LSTM), a gate recurrent unit (GRU), etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

Training is performed using training data. Once training is complete, the model is deployed for use as an executable construct that processes an input and provides an output based on the network of nodes and connections defined in the model.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, loop transformation, an instruction sequence to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

In the example of FIG. 2, the variant generator 202 utilizes ML/AI techniques. In examples disclosed herein, the variant generator 202 utilizes a deep neural network (DNN) model. In general, machine learning models/architectures that are suitable to use in the example approaches disclosed herein will be supervised. However, other examples may include machine learning models/architectures that utilize unsupervised learning. In examples disclosed herein, ML/AI models are trained using gradient descent. In examples disclosed herein, the hyperparameters utilized to train the ML/AI model control the exponential decay rates of the moving averages of the gradient descent. Such hyperparameters are selected by, for example, iterating through a grid of hyperparameters until the hyperparameters meet an acceptable value of performance. However, any other training algorithm may additionally or alternatively be used.

In the illustrated example of FIG. 2, the variant generator 202 alters the hybrid scheduling by inserting into a DNN, the total input and output dimensions of an algorithm. The DNN is trained by using data (e.g., speed of performance, power consumption, etc.) acquired by running an arbitrary algorithm on a hardware accelerator according to a success function (e.g., speed of performance, power consumption, etc.). The output of the DNN is a cost model that allows the variant generator 202 to compare and contrast different partitioning strategies. Based on the training, the variant generator 202 can determine partitioning strategies that are viable candidates for a given algorithm.

Regardless of the ML/AI model that is used, once the ML/AI model is trained, the ML/AI model generates a cost model for a generic processing element. The variant generator 202 then utilizes the cost model to select a partitioning strategy and/or partitioning strategies that are viable candidates for a given algorithm. In the example of FIG. 2, after selecting a partitioning strategy, the variant generator 202 partitions the algorithm into tiles.

In the example of FIG. 2, the variant generator 202 selects a tile to process. The variant generator 202 determines whether the selected tile has the same bounds as any prior tiles that have been processed for that algorithm. If the selected tile does have the same bounds a previously processed tile, the variant generator 202 determines whether there are any subsequent tiles to be processed. In this manner, only tiles of an algorithm that have unique bounds will be processed and can be reused across different partitioning strategies. This eliminates redundant variants and reduces the amount of memory occupied by the different variants for a given algorithm.

In the illustrated example of FIG. 2, if variant generator 202 determines that the selected tile does not have the same bounds as a previously processed tile, the variant generator 202 selects a processing element for which to generate a variant of the respective tile. The variant generator 202 subsequently generates a schedule of the selected tile for the selected processing element. This can be done by doing a search through the possible variant space and finding the best candidate. The discrimination between candidates is done using a cost model which could be either empirically based or learned. After generating a schedule, the variant generator 202 compiles a variant of the tile capable of being executed on the selected processing element at runtime. The variant generator 202 then adds the compiled variant to the variant library 210, and the variant generator 202 adds a corresponding variant symbol to a working jump table associated with the jump table library 212.

In the example of FIG. 2, the variant generator 202 repeats this process for each processing element, for each tile, and for each partitioning strategy. After all the tiles have been processed for all the processing elements and all the partitioning strategies have been utilized, the variant generator 202 adds working jump table to the jump table library 212. The variant generator 202 then compiles all of the variants in the variant library 210, the variant symbols in the jump table library 212, and the runtime scheduler 214 into the executable 208. In examples disclosed herein, the variant generator 202 compiles the executable 208 as a fat binary, however, in other examples, any suitable executable file may be used. The variant generator 202 repeats this process for each algorithm in the workload.

In the example illustrated in FIG. 2, the variant library 210 is a data structure associated with the executable 208 that stores the different variants of an algorithm represented at the sub-algorithmic level that the executable 208 performs. For example, the variant library 210 may be a data-section of a fat binary that includes the different variants associated with a particular algorithm, such as variants for each tile size, for each partitioning strategy for each processing element of the heterogeneous system 204. Moreover, the variant library 210 is linked to the example jump table library 212 and/or the runtime scheduler 214. The variant library 210 is a static library during execution of the executable 208 but may be updated with new or altered variants between executions of the executable 208.

In the example of FIG. 2, the jump table library 212 is a data structure associated with the executable 208 that stores a jump table including variant symbols that point to the location of respective variants in the variant library 212. For example, the jump table library 212 is a data-section of the executable 208 that includes a jump table associating various variant symbols (e.g., pointers) which respective variants located in the variant library 210. The jump table library 212 does not change during execution of the executable 208, however, the jump table library 212 may be accessed to call a respective variant to be loaded onto one or more of the processing elements of a heterogeneous system.

In the example illustrated in FIG. 2, the runtime scheduler 214 is a device that determines how to execute a workload (e.g., an algorithm and/or algorithms) during runtime of a heterogeneous system. For example, the runtime scheduler 214 may be a virtual machine (VM). Additionally, for example, the runtime scheduler 214 determines whether a workload should be offloaded from one processing element to another processing element in order to achieve a performance goal associated with the overall heterogeneous system and/or whether a workload should be split across multiple processing elements of the heterogeneous system.

In the example of FIG. 2, during execution of the executable 208 on the CPU 216, the runtime scheduler 214 determines a system-wide success function of the heterogeneous system 204. Additionally, the runtime scheduler 214 monitors performance characteristics of the heterogeneous system 204. For example, performance characteristics include metadata and metric information associated with each variant included in the executable 208. For example, such metadata and metric information includes an identifier for the workload (e.g., a name of an algorithm), compatibility constraints associated with drivers and other hardware of the heterogeneous system 204, version of the cost model utilized to generate a variant, algorithm execution size, and other data that ensures compatibility between execution of a workload (e.g., a variant) on each processing element and informs the runtime scheduler 214 of offload decisions.

In the example of FIG. 2, the performance characteristics collected by the runtime scheduler 214 may further include average execution time of a variant on each tile on a respective processing element, average occupancy of each processing element during runtime, stall rates, power consumption of the individual processing elements, computational cycle counts utilized by a processing element, memory latency when transferring a workload, hazards of offloading a workload from one processing element to another, system-wide battery life, amount of memory utilized, metrics associated with a communication bus between the various processing elements, and metrics associated with the memory of the heterogeneous system 204 (e.g., the storage 206).

In the example of FIG. 2, the runtime scheduler 214 determines whether partitioning is desirable for a given algorithm. For example, the runtime scheduler 214 may determine whether partitioning is desirable based on the performance characteristics of the heterogeneous system 204, the variant symbols in the jump table library 212, and/or the system-wide success function of the heterogeneous system 204. For example, at a default run, the runtime scheduler 214 may determine an algorithm with available tile variants be partitioned with large tiles on batch processors (e.g., GPUs) and smaller tiles on general purpose accelerators (e.g., FPGAs). Moreover, if a GPU 222 is executing a large partition, the runtime scheduler 214 may select to offload smaller partitions to the FPGA 218 and/or CPU 216 to hide the latencies associated with the variant executing on the GPU 222.

In the example of FIG. 2, the runtime scheduler may determine based on load and/or environmental characteristics that partitioning is desirable for a given algorithm. For example, under a specific load and/or environmental characteristics it may be undesirable to continuously execute algorithm partition variants on the GPU 222 due to power consumption considerations due to, for example some thermal constraints (e.g., a system-wide success function). However, the runtime scheduler 214 may determine that the system-wide success function is still attainable with intermittent execution of algorithm partition variants on the GPU 222. In such a scenario, the runtime scheduler 214 may select to execute algorithm partition variants on the CPU 216 and the VPU 220 on even cycles and the CPU 216 and the GPU 222 on odd cycles. Additionally, due to power-oriented success functions, the runtime scheduler 214 may select only a subset of the processing elements of the heterogeneous system 204 on which to execute algorithm partition variants.

In the illustrated example of FIG. 2, if the runtime scheduler 214 determines that partitioning is not desirable, the runtime scheduler 214 selects a processing element on which to execute the entirety of a given algorithm and then dispatches the algorithm to be executed by the selected processing element. However, if the runtime scheduler 214 determines that partitioning is desirable, the runtime scheduler 214 selects a partitioning strategy. The main concern of the runtime scheduler 214 is to select a partitioning strategy of the algorithm that will execute on the available processing elements under a given system-wide success function and converge for the complete execution of the algorithm.

In the example of FIG. 2, after selecting a partitioning strategy, the runtime scheduler 214 allocates memory in the storage 206 and/or the CPU storage 217 for each input and each output of the algorithm. This memory location is known as a root buffer and after allocating the memory in the storage 206 and the CPU storage 217, the runtime scheduler 214 divides the root buffer along the boundaries used in partitioning the algorithm. For example, the runtime scheduler 214 divides the root buffer based on which portions of the bound buffers are accessed as inputs (e.g., whether the input is a constant value or whether it is a variable value) and the interval of access of these inputs (e.g., how often these inputs are accessed) in order to prevent unnecessary data movement between different processing elements.

In the example illustrated in FIG. 2, the runtime scheduler 214 determines whether there has been a prior execution of the algorithm utilizing a similar partitioning strategy. Similarity characteristics may include, for example, similar operation, abstract syntax tree similarity, and/or similarity tensor dimensions. If the runtime scheduler 214 determines that there has been a prior execution of the algorithm utilizing a similar partitioning strategy (e.g., one or more same SAP fragments, tiles, etc. were executed on a processing element), the runtime scheduler 214 utilizes the results already determined in the prior execution.

In the example of FIG. 2, if the runtime scheduler 214 determines that there has not been a prior execution of the algorithm utilizing a similar partitioning strategy, the runtime scheduler 214 determines whether the processing elements selected for the partitioning strategy have access to the memory (e.g., the storage 206) of the heterogeneous system 204. If the processing elements selected for the partitioning strategy do not have access to the memory of the heterogeneous system 204, the runtime scheduler 214 backs up the partitioning splits of the root buffer on the respective processing elements associated with the partitioning splits. For example, the runtime scheduler 214 may back up the partitioned splits by utilizing a compute application programming interface (API) to create a system-memory address that is backed by a processing element-side memory allocation. In such an example, the address is aliased between devices and data movement is carefully managed to prevent corruption.

In examples disclosed herein, by backing up the partitioning splits of the root buffer of the respective processing elements associated with the partitioning splits, the runtime scheduler 214 can offload input data ahead of computation and defer output data movement until results are needed.

In the example illustrated in FIG. 2, if the processing elements selected for the partitioning strategy have access to the memory of the heterogeneous system 204, the runtime scheduler 214 dispatches the algorithm partition variants to their respective processing elements to be executed. After dispatching the algorithm partition variants to their respective processing elements to be executed, the runtime scheduler 214 waits for the algorithm partition variants to finish executing on their respective processing elements. Once the algorithm partition variants have finished executing, the runtime scheduler 214 moves the results of the algorithm partition variants on processing element specific memory (e.g., the GPU storage 223, the VPU storage 221, etc.), if any, to the system memory (e.g., the storage 206 and/or the CPU storage 217). The runtime scheduler 214 then outputs the composite result of the partitioned algorithm for use. The runtime scheduler 214 subsequently repeats this process for all the algorithms in a workload.

Figure 3:
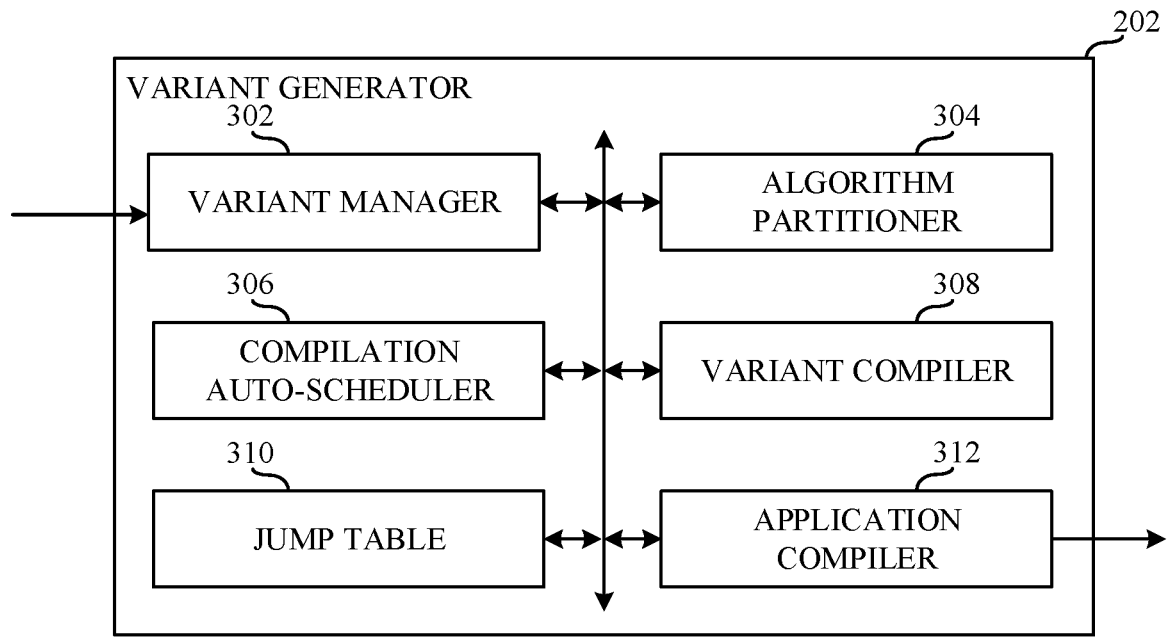
FIG. 3 is a block diagram illustrating an example implementation of the variant generator of FIG. 2.

FIG. 3 is a block diagram illustrating an example implementation of the variant generator 202 of FIG. 2. The example variant generator 202 includes an example variant manager 302, an example algorithm partitioner 304, an example compilation auto-scheduler 306, an example variant compiler 308, an example jump table 310, and an example application compiler 312.

In examples disclosed herein, each of the variant manager 302, the algorithm partitioner 304, the compilation auto-scheduler 306, the variant compiler 308, the jump table 310, and the application compiler 312 is in communication with the other elements of the variant generator 202. For example, the variant manager 302, the algorithm partitioner 304, the compilation auto-scheduler 306, the variant compiler 308, the jump table 310, and the application compiler 312 are in communication via a communication bus.

In some examples disclosed herein, the variant manager 302, the algorithm partitioner 304, the compilation auto-scheduler 306, the variant compiler 308, the jump table 310, and the application compiler 312 may be in communication via any suitable wired and/or wireless communication method.

Additionally, in some examples disclosed herein, each of the variant manager 302, the algorithm partitioner 304, the compilation auto-scheduler 306, the variant compiler 308, the jump table 310, and the application compiler 312 may be in communication with any component exterior to the variant generator 202 via any suitable wired and/or wireless communication method.

In the example of FIG. 3, the variant manager 302 obtains one or more algorithms from a device such as an external device and/or a code developer's workstation. The variant manager 302 determines the processing elements of a target heterogeneous system for which the algorithm has been written. After determining the processing elements of the target heterogeneous system, the variant manager 302 determines whether each algorithm received is a candidate for partitioning.

In some examples, the variant manager 302 implements example means for managing algorithms for which the variant generator 302 is to generate SAP variants. The managing means is implemented by executable instruction such as that implemented by at least blocks 702, 704, 706, 714, 716, 718, 728, 730, 732 and 738 of FIG. 7, which may be executed on at least one processor such as the example processor 912 shown in the example of FIG. 9. In other examples, the managing means is implemented by hardware logic, hardware implemented state machines, logic circuitry, and/or any other combination of hardware, software, and/or firmware.

In the example of FIG. 3, the variant manager 302 determines whether an algorithm is a candidate for SAP by analyzing the size of the input data to an algorithm and the size of the output data from the algorithm. The variant manager 302 determines whether the size of the algorithm inputs and outputs justifies the associated latencies of moving the workload from one processing element to multiple processing for which the SAP variants have been compiled. For example, the variant manager 302 infers the size of the algorithm inputs and outputs by analyzing one or more bound buffers of the algorithm. If the size of the algorithm inputs and/or the size of the algorithm outputs meets a threshold value, the variant manager 302 determines that the algorithm is a candidate for partitioning. If an algorithm is not a candidate for partitioning, the variant manager 302 transmits the compilation auto-scheduler 306 to be subsequently processed and compiled by the variant compiler 308 into respective variants to execute the entirety of the algorithm on the respective processing elements of a heterogeneous system.

In the example of FIG. 3, if an algorithm is a candidate for partitioning, the algorithm partitioner 304 selects a partitioning strategy. The algorithm partitioner 304 selects a partitioning strategy based on a type of the algorithm, the size of the inputs and the size of the outputs of the algorithm, and the processing elements of the target system. In order to select the partitioning strategy, the examples disclosed herein utilize one or more DNN models.

In some examples, the example algorithm partitioner 304 implements example means for partitioning algorithms into SAP tiles. The partitioning means is implemented by executable instruction such as that implemented by at least blocks 708 and 712 of FIG. 7, which may be executed on at least one processor such as the example processor 912 shown in the example of FIG. 9. In other examples, the partitioning means is implemented by hardware logic, hardware implemented state machines, logic circuitry, and/or any other combination of hardware, software, and/or firmware.

In the illustrated example of FIG. 3, the algorithm partitioner inserts the total input and output dimensions of an algorithm into a DNN. The output of the DNN is a cost model that allows the algorithm partitioner 304 to determine a partitioning strategy and/or partitioning strategies that are viable candidates for a given algorithm. After selecting a partitioning strategy, the algorithm partitioner 304 partitions the algorithm into tiles (partitions, fragments, etc.).

In the example of FIG. 3, the variant manager 302 selects a tile for the variant generator 202 to process. The variant manager 302 determines whether the selected tile has the same bounds as any prior tiles that have been processed for that algorithm. If the selected tile does have the same bounds a previously processed tile, the variant manager 302 determines if there are any subsequent tiles to be processed.

In the illustrated example of FIG. 3, if variant manager 302 determines that the selected tile does not have the same bounds as a previously processed tile, the variant manager 302 selects a processing element for which to generate a variant of the respective tile. The variant manager 302 subsequently transmits the selected tile and an identifier of the selected processing element to the compilation auto-scheduler 306.

In the example illustrated in FIG. 3, the compilation auto-scheduler 306 generates a schedule of the selected tile (e.g., partition, fragment, etc.) for the selected processing element received and/or otherwise obtained from the variant manager 302. In examples disclosed herein, the compilation auto-scheduler 306 generates a schedule through the use of auto-tuning. In other examples, any suitable auto-scheduling method may be used to generate a schedule of the selected tile (e.g., partition, fragment, etc.) for the selected processing element.

In some examples, the example compilation auto-scheduler 306 implements example means for scheduling SAP tiles for selected processing elements based on, for example, a cost model. The scheduling means is implemented by executable instruction such as that implemented by at least block 720 of FIG. 7, which may be executed on at least one processor such as the example processor 912 shown in the example of FIG. 9. In other examples, the scheduling means is implemented by hardware logic, hardware implemented state machines, logic circuitry, and/or any other combination of hardware, software, and/or firmware.

In the illustrated example of FIG. 3, the variant compiler 308 compiles the schedule generated by the compilation auto-scheduler 306 into a variant of the selected tile capable of being executed on the selected processing element at runtime. For example, the variant compiler 308 compiles the schedule of the selected tile for the selected processing element into a method, class, or object that can be called by an executable application. After compiling the variant, the variant compiler 308, transmits the variant to an application and/or other executable file to be compiled. Additionally, the variant compiled by the variant compiler 308 is transmitted to the jump table 310.

In some examples, the example variant compiler 308 implements example means for variant compiling to compile schedules generated by a compilation auto-scheduler. The variant compiling means is implemented by executable instruction such as that implemented by at least blocks 710, 722, 724, and 726 of FIG. 7, which may be executed on at least one processor such as the example processor 912 shown in the example of FIG. 9. In other examples, the variant compiling means is implemented by hardware logic, hardware implemented state machines, logic circuitry, and/ or any other combination of hardware, software, and/or firmware.

In the example of FIG. 3, the jump table 310 associates the different variants generated by the variant compiler 308 with a location where the respective variants will be located in an executable application (e.g., a fat binary). For example, the jump table 310 associates the different variants with their respective location in an executable application via a variant symbol (e.g., a pointer) that points to the location of the respective variant in the executable application.

In some examples, the example jump table 310 implements example means for storing variant symbols to associate different variants with a location where the respective variants will be located in an executable application. The storing means is implemented by executable instruction such as that implemented by at least block 734 of FIG. 7, which may be executed on at least one processor such as the example processor 912 shown in the example of FIG. 9. In other examples, the storing means is implemented by hardware logic, hardware implemented state machines, logic circuitry, and/or any other combination of hardware, software, and/or firmware.

In the example of FIG. 3, the application compiler 312 compiles the algorithms, respective variants, variant symbols, and a runtime scheduler (e.g., the runtime scheduler 214) into executable applications for storage. The application compiler 312 compiles the algorithms, respective variants, and the runtime scheduler as a compiled version of the original algorithm (e.g., code) received by the variant generator 202. For example, if the algorithm is written in C/C++, the application compiler 312 compiles the algorithm, the respective variants, variant symbols, and a runtime scheduler into an executable C/C++ application that includes the variants written in their respective languages for execution on respective processing elements. In examples disclosed herein, the executable applications compiled by application compiler 312 are fat binaries. However, in other examples, the executable application compiled by the application compiler 312 may be any suitable executable file.

In some examples, the example application compiler 312 implements example means for compiling algorithms, SAP variants, respective SAP variant symbols, and a runtime scheduler into executable applications for storage. The compiling means is implemented by executable instruction such as that implemented by at least block 736 of FIG. 7, which may be executed on at least one processor such as the example processor 912 shown in the example of FIG. 9. In other examples, the compiling means is implemented by hardware logic, hardware implemented state machines, logic circuitry, and/or any other combination of hardware, software, and/or firmware.

Figure 4:
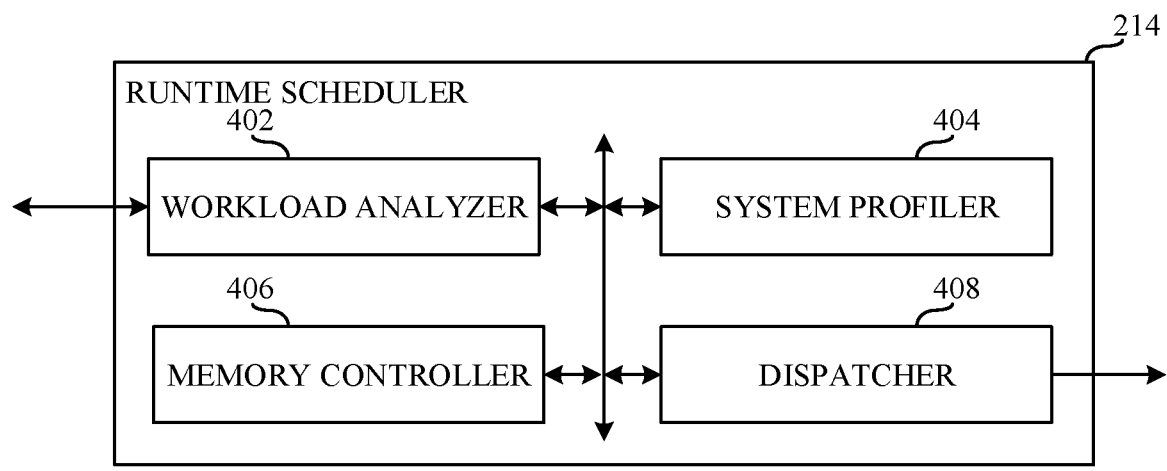
FIG. 4 is a block diagram illustrating an example implementation of the runtime scheduler of FIG. 2.

FIG. 4 is a block diagram illustrating an example implementation of the runtime scheduler 214 of FIG. 2. The example runtime scheduler 214 includes an example workload analyzer 402, an example system profiler 404, an example memory controller 406, and an example dispatcher 408. In examples disclosed herein, each of the workload analyzer 402, the system profiler 404, the memory controller 406, and the dispatcher 408 is in communication with the other elements of the runtime scheduler 214. For example, the workload analyzer 402, the system profiler 404, the memory controller 406, and the dispatcher 408 are in communication via a communication bus.

In some examples disclosed herein, the workload analyzer 402, the system profiler 404, the memory controller 406, and the dispatcher 408 may be in communication via any suitable wired and/or wireless communication method.

Additionally, in some examples disclosed herein, each of the workload analyzer 402, the system profiler 404, the memory controller 406, and the dispatcher 408 may be in communication with any component exterior to the runtime scheduler 214 via any suitable wired and/or wireless communication method.

In the example of FIG. 4, during execution of the executable 208 on a processing element, the workload analyzer 402 determines a success function associated with the entire performance of a heterogeneous system. The workload analyzer 402 additionally determines whether partitioning is desirable for a given algorithm. For example, the workload analyzer 402 may determine whether partitioning is desirable based on the performance characteristics of the given heterogeneous system, the variant symbols in the jump table library 212, and/or the success function associated with the entire performance of a given heterogeneous system.

In some examples, the example workload analyzer 402 implements example means for analyzing a workload for runtime scheduling on a heterogeneous system. The analyzing means is implemented by executable instruction such as that implemented by at least blocks 802, 806, 808, 810, 818, 820, 830, and 832 of FIG. 8, which may be executed on at least one processor such as the example processor 1012 shown in the example of FIG. 10. In other examples, the analyzing means is implemented by hardware logic, hardware implemented state machines, logic circuitry, and/or any other combination of hardware, software, and/or firmware.

In the illustrated example of FIG. 4, if the workload analyzer 402 determines that partitioning is not desirable, the workload analyzer 402 selects a processing element on which to execute the entirety of a given algorithm and then dispatches the algorithm to be dispatched by the dispatcher 408 to be executed by the selected processing element. If the workload analyzer 402 determines that partitioning is desirable, the workload analyzer 402 selects a partitioning strategy. The workload analyzer 402 selects a partitioning strategy and/or partitioning strategies of the algorithm that will execute on the available processing elements under the success function associated with the entire performance of the given heterogeneous system and a partitioning strategy and/or partitioning strategies that will result in a convergence of partitions for the complete execution of the algorithm.

In the example illustrated in FIG. 4, the workload analyzer 402 additionally determines whether there has been a prior execution of the algorithm utilizing a similar partitioning strategy. If there has been a prior execution of the algorithm utilizing a similar partitioning strategy, the workload analyzer 402 utilizes the results already determined in the prior execution.

In the example of FIG. 4, the system profiler 404 monitors performance characteristics of the given heterogeneous system (e.g., the heterogeneous system 204). For example, performance characteristics include metadata and metric information associated with each variant included in the executable 208. The performance characteristics of a given heterogeneous system, as monitored by the system profiler 404, are utilized by the other elements of the runtime scheduler 214.

In some examples, the example system profiler 404 implements example means for profiling a heterogeneous system executing a workload. The profiling means is implemented by executable instruction such as that implemented by at least block 804 of FIG. 8, which may be executed on at least one processor such as the example processor 1012 shown in the example of FIG. 10. In other examples, the profiling means is implemented by hardware logic, hardware implemented state machines, logic circuitry, and/or any other combination of hardware, software, and/or firmware.

In the example of FIG. 4, after the workload analyzer 402 selects a partitioning strategy, the memory controller 406 allocates memory in the shared storage of the given heterogeneous system for each input and each output of the algorithm as a root buffer. After allocating the memory in the shared memory of the given heterogeneous system, the memory controller 406 divides and/or otherwise splits the root buffer along the boundaries used in partitioning the algorithm. The memory controller 406 may divide the root buffer based on, for example, which portions of the buffers are accessed as inputs and the interval of access of these inputs.

In some examples, the example memory controller 406 implements example means for controlling various memories associated with a heterogenous system (e.g., individual processing element memory, heterogeneous system memory, shared memory, etc.). The controlling means is implemented by executable instruction such as that implemented by at least blocks 814, 816, 822, 824, and 828 of FIG. 8, which may be executed on at least one processor such as the example processor 1012 shown in the example of FIG. 10. In other examples, the profiling means is implemented by hardware logic, hardware implemented state machines, logic circuitry, and/or any other combination of hardware, software, and/or firmware.

In the example of FIG. 4, based on a determination by the workload analyzer 402 that there has not been a prior execution of the algorithm utilizing a similar partitioning strategy, the memory controller 406 determines whether the processing elements selected for the partitioning strategy have access to the shared memory of the given heterogeneous system. If some of the processing elements selected for the partitioning strategy do not have access to the shared memory of the heterogeneous system, the memory controller 406 backs up the partitioning splits of the root buffer on the respective memories of the processing elements associated with the partitioning splits. Because the shared memory has been backed up on the respective processing elements by the memory controller 406, the workload analyzer 402 can offload input data ahead of computation and defer output data movement until results are needed.

In the example illustrated in FIG. 4, if (a) the memory controller 406 determines that all the processing elements selected for the partitioning strategy have access to the memory of the given heterogeneous system and/or (b) the memory controller 406 backs up the root buffer splits on the processing elements without access to the shared memory of the given heterogeneous system, workload analyzer 402 causes the dispatcher 408 to dispatch the algorithm partition variants to their respective processing elements to be executed.

In some examples, the example dispatcher 408 implements example means for dispatching variants to be executed on processing elements to facilitate the execution of one or more algorithms. The dispatching means is implemented by executable instruction such as that implemented by at least blocks 812 and 826 of FIG. 8, which may be executed on at least one processor such as the example processor 1012 shown in the example of FIG. 10. In other examples, the dispatching means is implemented by hardware logic, hardware implemented state machines, logic circuitry, and/or any other combination of hardware, software, and/or firmware.

In the example of FIG. 4, after the dispatcher 408 dispatches the algorithm partition variants to their respective processing elements to be executed, the workload analyzer 402 waits for the algorithm partition variants to finish executing on their respective processing elements. Once the algorithm partition variants have finished executing, the workload analyzer 402 sends a signal to the memory controller 406 to cause the memory controller 406 to move the results of the algorithm partition variants on processing element specific memory, if any, to the shared memory of the given heterogeneous system. The workload analyzer 402 then outputs the composite result of the partitioned algorithm for use.

FIGS. 5A-5E are block diagrams illustrating various example partitioning strategies associated with an algorithm to be run on a heterogeneous system. In general, the algorithm partitioner 304 can partition algorithms via a variety of strategies and one or more partitioning strategies may be suitable for a given algorithm on a target heterogeneous system. Overall, the algorithm partitioner 304 partitions algorithms into tiles that can be run concurrently on different processing elements of the target heterogeneous system.

Figure 5A:
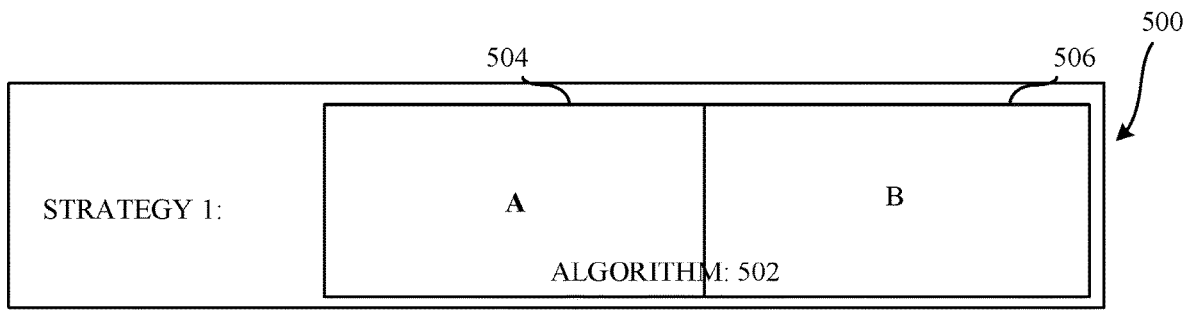
FIGS. 5A-5E are block diagrams illustrating various example partitioning strategies associated with an algorithm to be run on a heterogeneous system.

FIG. 5A is a block diagram illustrating an example first partitioning strategy 500 to partition an example algorithm 502. For example, the algorithm partitioner 304 may partition the algorithm 502 utilizing the first partitioning strategy 500. In such an example, the algorithm partitioner 304 partitions the algorithm 502 into an example first tile 504 and an example second tile 506. In the first partitioning strategy 500, the algorithm partitioner 304 partitions the algorithm 502 into two substantially equal sized sub-algorithmic tiles. To accomplish such a split, the inputs and outputs of the algorithm are additionally divided and/or otherwise split in half such that the data used in the first tile 504 is not needed and/or otherwise used by the sub-algorithmic partition of the second tile 506. A goal of the algorithm partitioner 304 is to divide the algorithm 502 into partitions that reduces the overall data movement between partitions (e.g., the first tile 504 and the second tile 506) during runtime execution of the algorithm 502.

In the example of FIG. 5A, the first partitioning strategy 500 is suitable for workloads that will be executed on a heterogeneous system including at least two processing elements that are capable of fixed data and/or fixed computational sizes. For example, the first partitioning strategy 500 may be desirable for a heterogeneous system including two batch processors (e.g., GPUs). In such an example, the first partitioning strategy 500 offers the batch processors a sufficiently large tile size that will justify the latencies associated with offloading the algorithm from a primary processing element (e.g., a CPU) of a given heterogeneous system.

However, if a given heterogeneous system only includes a CPU and a GPU, the first partitioning strategy 500 may be undesirable due to the relatively slower computation speed on a CPU relative to a GPU. Additionally, the expected performance characteristics of a given heterogeneous system may affect the selection of a partitioning strategy by the algorithm partitioner 304.

For example, if a given heterogeneous system is expected to operate under a power consumption limit due to given environmental conditions, the algorithm partitioner 304 may partition the algorithm 502 such that some of the processing elements of the given heterogeneous system are not utilized in order to meet the given power consumption limitation. Such a partitioning strategy may not optimize the speed of execution; however, it meets the expected performance characteristics and expected system-wide success function.

Figure 5B:
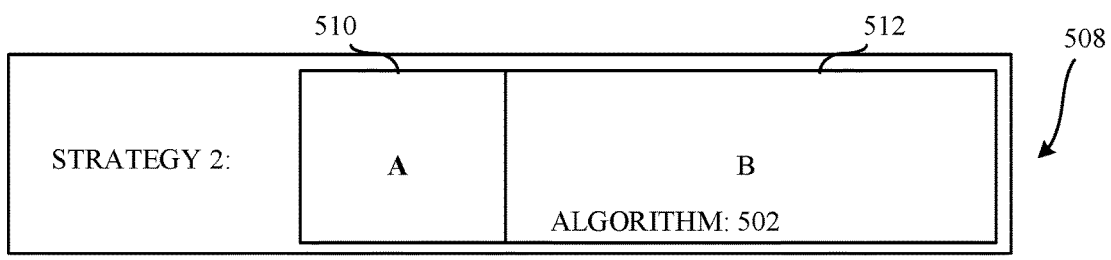

FIG. 5B is a block diagram illustrating an example second partitioning strategy 508 to partition the example algorithm 502. For example, the algorithm partitioner 304 may partition the algorithm 502 utilizing the second partitioning strategy 508. In such an example, the algorithm partitioner 304 partitions the algorithm 502 into an example third tile 510 and an example fourth tile 512. In the second partitioning strategy 508, the algorithm partitioner 304 partitions the algorithm 502 into the third tile 510 which is substantially smaller relative the fourth tile 512 and the fourth tile 512. The second partitioning strategy 508 is better suited for a given heterogeneous system including at least one batch processor and at least one general-purpose processing element (e.g., a CPU).

For example, the second partitioning strategy 508 is more suitable for such a heterogeneous system because the relatively smaller third tile 510 can be executed on the general-purpose processing element, while the fourth tile 512 can be executed on the batch processor. As the third tile 510 operates on substantially less data than the fourth tile 512, the relatively slower processing speed of the general-purpose processing element as compared to the batch processor indicates that the general-purpose processing element will execute the third tile 510 in a substantially similar amount of time as the batch processor will execute the fourth tile 512.

Figure 5C:
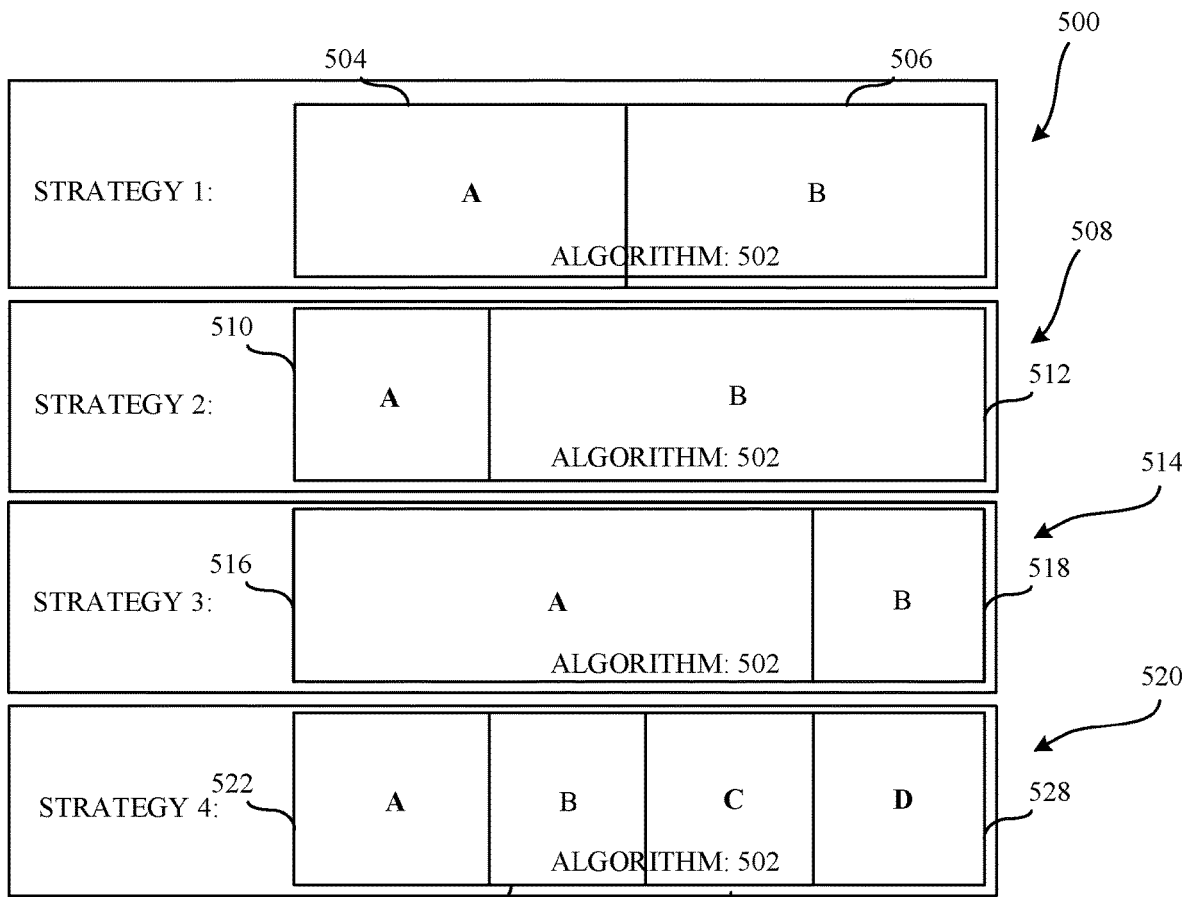

FIG. 5C is a block diagram illustrating the example first partitioning strategy 500, the example second partitioning strategy 508, an example third partitioning strategy 514, and an example fourth partitioning strategy 520 to partition the example algorithm 502. As illustrated in FIGS. 5A and 5B, different partitioning strategies may be desirable for different systems, or for a given system to account for different performance characteristics at runtime that change the available processing resources on a heterogeneous system. For example, the first partitioning strategy 500 may desirable when a workload is substantially large enough to fit across two batch processors (e.g., GPUs) and the two batch processors have enough available processing resources to handle the substantially large SAP tiles.

Since it is impossible to determine the actual performance characteristics for a given heterogeneous system under any load and/or environmental condition, it is advantageous to partition a given algorithm (e.g., the algorithm 502) into a variety of suitable partitions so that a runtime scheduler (e.g., the runtime scheduler 214) can effectively offload algorithms and or SAP tiles of algorithms to available processing elements during runtime. For example, as previously illustrated, the first partitioning strategy 500 is desirable when two batch processors (e.g., GPUs) are available, whereas the second partitioning strategy 508 is desirable when a general-purpose processing element and a batch processor are available.

In the example of FIG. 5C, the third partitioning strategy 514 introduces a new partitioning strategy. For example, the algorithm partitioner 304 may partition the algorithm 502 utilizing the third partitioning strategy 514. In such an example, the algorithm partitioner 304 partitions the algorithm 502 into an example fifth tile 516 and an example sixth tile 518. The third partitioning strategy 514 is similar to the second partitioning strategy 508; however, under the third partitioning strategy 514, the algorithm partitioner 304 partitions the algorithm 502 into the fifth tile 516 which is substantially larger relative the sixth tile 518 and the sixth tile 518, whereas under the second partitioning strategy 508, the algorithm partitioner 304 partitions the algorithm into the third tile 510 which is substantially smaller than the fourth tile 512 and the fourth tile 512.

In the illustrated example of FIG. 5C, the third partitioning strategy 514 illustrates that the order in which the algorithm partitioner 304 partitions an algorithm (e.g., the algorithm 502) is pertinent to successful execution of the algorithm at runtime. For example, if there is a central access in algorithm, the algorithm partitioner 304 may partition the algorithm according to the third partitioning strategy 514.

In the example of FIG. 5C, the algorithm partitioner 304 may partition the algorithm 502 utilizing the fourth partitioning strategy 520. In such an example, the algorithm partitioner 304 partitions the algorithm 502 into an example seventh tile 522, an example eighth tile 524, an example ninth tile 526, and an example tenth tile 528. In the fourth partitioning strategy 520, the algorithm partitioner 304 partitions the algorithm 502 into the seventh tile 522, the eighth tile 524, the ninth tile 526, and the tenth tile 528 which are all substantially similar in size. The fourth partitioning strategy 520 is better suited for a given heterogeneous system where at least four general-purpose processing elements are available for offloading. For example, the general-purpose processing elements may include one or more cores of a CPU, one or more FPGAs, and/or any other suitable general-purpose processing element.

Figure 5D:
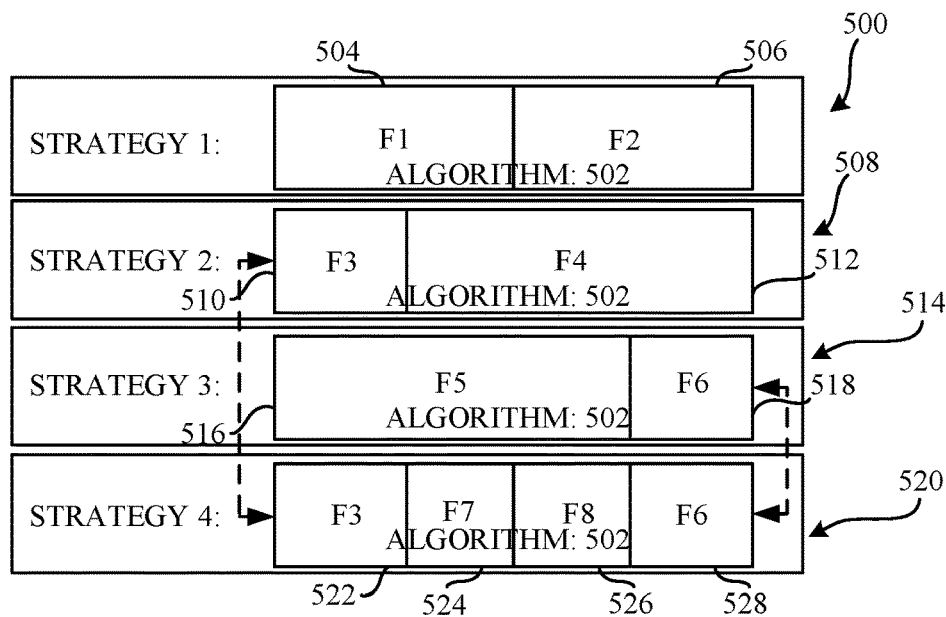

FIG. 5D is a block diagram illustrating the example first partitioning strategy 500, the example second partitioning strategy 508, the example third partitioning strategy 514, and the example fourth partitioning strategy 520 to partition the example algorithm 502. FIG. 5D illustrates that across a variety of partitioning strategies, similar tile sizes (e.g., partition sizes, fragment sizes, etc.) may utilized. In the example of FIG. 5D, the third tile 510 includes the same bounds as the seventh tile 522, thus, the algorithm partitioner 304 reuses the third tile 510 from the second partitioning strategy 508 as the seventh tile 522 in the fourth partitioning strategy 520 and/or vice versa. Similarly, the sixth tile 518 includes the same bounds as the tenth tile 528, thus, the algorithm partitioner 304 reuses the sixth tile 518 from the third partitioning strategy 514 as the tenth tile 528 in the fourth partitioning strategy 520 and/or vice versa. By reusing similarly bounded tiles across partitioning strategies, the algorithm partitioner 304 eliminates redundant variants of sub-algorithm partitions and reduces the amount of memory consumed by an executable file (e.g., the executable 208, a fat binary, etc.) including the SAP variants.

Figure 5E:
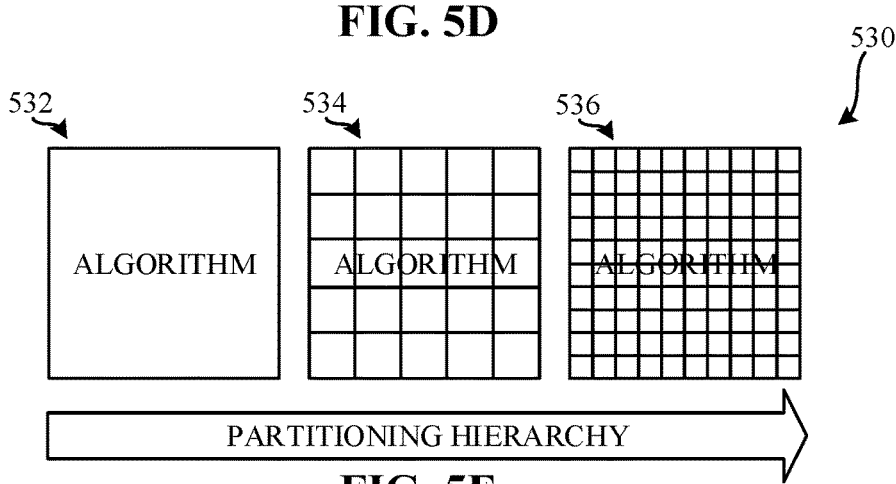

FIG. 5E is a block diagram illustrating a hierarchy 530 of partitioning strategies. FIG. 5E illustrates that the algorithm partitioner 304 may utilize SAP to partition an algorithm at any desirable granularity. By including a variety of granularity of partitions of an algorithm (e.g., the algorithm 502), the algorithm partitioner 304 can increase the scalability of algorithms operating as SAP algorithms. As illustrated in FIG. 5E, the hierarchy 530 includes three stages of granularity, an example first granularity 532, an example second granularity 534, and an example third granularity 536; however, any number of stages of granularity may be included in the hierarchy 530.

In the example of FIG. 5E, the first granularity 532 illustrates when SAP is not applied to an algorithm. This a course granularity that may work for algorithms with a sufficiently small input data size and/or output data size. At the second granularity 534, the algorithm is partitioned into 25 substantially equal sized tiles. At the third granularity 536, the algorithm is partitioned into 100 substantially equal sized tiles. At the highest level of granularity, the algorithm is expressed as a monolithic tile but as the level of granularity decreases, the algorithm is sub-divided into N*M tile variants. For each tile variant, the variant generator 202 may produce a processing element specific variant. Moreover, for an algorithm decomposed into t tile sizes, under n partitioning strategies, to be executed on p processing elements, the variant generator 202 will generate t*n*p possible variants. To prevent incredibly large executables (e.g., the executable 208, a fat binary, etc.), the variant generator 202 can opt not to generate a variant for certain tile sizes that may be impractical to run a specific processing element. Thus, the algorithm partitioner 304 determines the partitioning strategy to utilize based on at least the top-level tiling size, the method of sub-dividing tiles, an upper threshold of sub-divisions, and heuristics that define when a tile size is not suitable for a given processing element.

Figure 6:
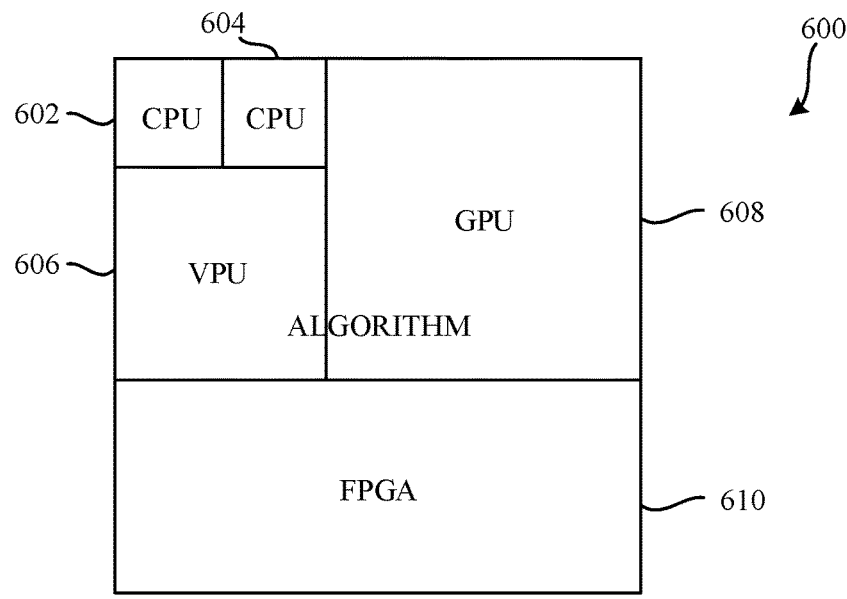
FIG. 6 is a block diagram illustrating an example runtime scheduling configuration of an algorithm executing on an example heterogeneous system.

FIG. 6 is a block diagram illustrating an example runtime scheduling configuration 600 of an algorithm executing on an example heterogeneous system. The example runtime scheduling configuration 600 includes an example first SAP variant 602, an example second SAP variant 604, an example third SAP variant 606, an example fourth SAP variant 608, and an example fifth SAP variant 610.

In the example of FIG. 6, an algorithm is decomposed into five SAP variants that the runtime scheduler 214 "fits" onto a given heterogeneous system. For example, based on at least the performance characteristics of a given heterogeneous system and a system-wide success function, the runtime scheduler 214 will access specific SAP variants generated by the variant generator 202 and stored in the variant library 210 by calling the respective locations utilizing variant symbols in the jump table library 212.

In the illustrated example of FIG. 6, based on at least the performance characteristics of a given heterogeneous system, the runtime scheduler 214 selects a runtime configuration of SAP variants on the heterogeneous system to completely represent an algorithm. For example, based on at least the performance characteristics of the heterogeneous system 204, the runtime scheduler 214 may select to execute the first SAP variant 602 on the CPU 216, the second SAP variant 604 on the CPU 216, the third SAP variant 606 on the VPU 220, the fourth SAP variant 608 on the GPU 222, and the fifth SAP variant on the FPGA 218. As illustrated in FIG. 6, the first SAP variant 602 and second SAP variant 604 make up a substantially smaller portion of the given algorithm relative to the other SAP variants and thus the CPU 216 is a suitable location on the heterogeneous system 204 to execute such a small portion of the algorithm. Additionally, the third SAP variant 606, the fourth SAP variant 608, and the fifth SAP variant 610 are substantially larger than the first SAP variant 602 and the second SAP variant 604 and thus the VPU 220, the GPU 222, and the FPGA 218, respectively, are desirable locations on the heterogeneous system 204 to offload such large portions of the given algorithm.

While an example manner of implementing the variant generator 202 of FIG. 2 is illustrated in FIG. 3 and an example manner of implementing the executable 208 of FIG. 2 is shown in FIGS. 2 and 4, one or more of the elements, processes and/or devices illustrated in FIGS. 2, 3, and FIG. 4 may be combined, divided, re-arranged, omitted, eliminated and/or implemented in any other way. Further, the example variant manager 302, the example algorithm partitioner 304, the example compilation auto-scheduler 306, the example variant compiler 308, the example jump table 310, the example application compiler 312, and/or, more generally, the example variant generator 202 of FIG. 3 and/or the example variant library 210, the example jump table library 212, the example workload analyzer 402, the example system profiler 404, the example memory controller 406, the example dispatcher 408, and/or, more generally, the example runtime scheduler 314 and/or, the example executable 208 of FIG. 2 may be implemented by hardware, software, firmware and/or any combination of hardware, software and/or firmware. Thus, for example, any of the example variant manager 302, the example algorithm partitioner 304, the example compilation auto-scheduler 306, the example variant compiler 308, the example jump table 310, the example application compiler 312, and/or, more generally, the example variant generator 202 of FIG. 3 and/or the example variant library 210, the example jump table library 212, the example workload analyzer 402, the example system profiler 404, the example memory controller 406, the example dispatcher 408, and/or, more generally, the example runtime scheduler 314 and/or, more generally, the example executable 208 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example variant manager 302, the example algorithm partitioner 304, the example compilation auto-scheduler 306, the example variant compiler 308, the example jump table 310, the example application compiler 312, and/or, more generally, the example variant generator 202 of FIG. 3 and/or the example variant library 210, the example jump table library 212, the example workload analyzer 402, the example system profiler 404, the example memory controller 406, the example dispatcher 408, and/or, more generally, the example runtime scheduler 314 and/or, more generally, the example executable 208 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example variant generator 202 of FIGS. 2 and 3 and/or the example runtime scheduler 214 of FIGS. 2 and 4, and/or, more generally, the example executable 208 of FIG. 2 may include one or more elements, processes and/or devices in addition to, or instead of, those illustrated in FIGS. 2, 3, and FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
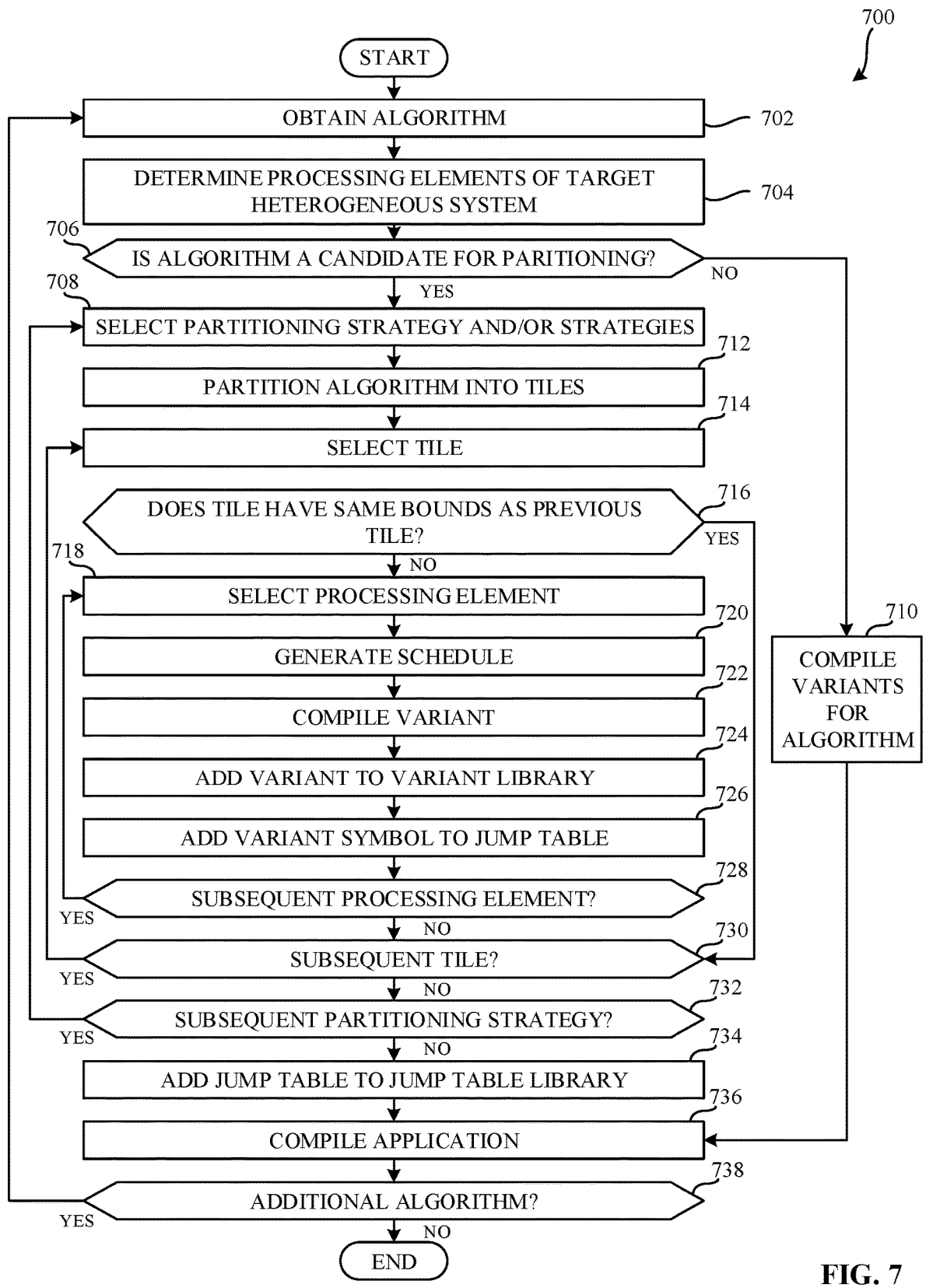
FIG. 7 is a flowchart representative of machine readable instructions which may be executed to implement the variant generator of FIGS. 2 and 3.

A flowchart representative of example hardware logic, machine readable instructions, hardware implemented state machines, and/or any combination thereof for implementing the variant generator 202 of FIGS. 2 and 3 is shown in FIG. 7. The machine readable instructions may be one or more executable programs or portion(s) of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIG. 7, many other methods of implementing the example variant generator 202 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 8:
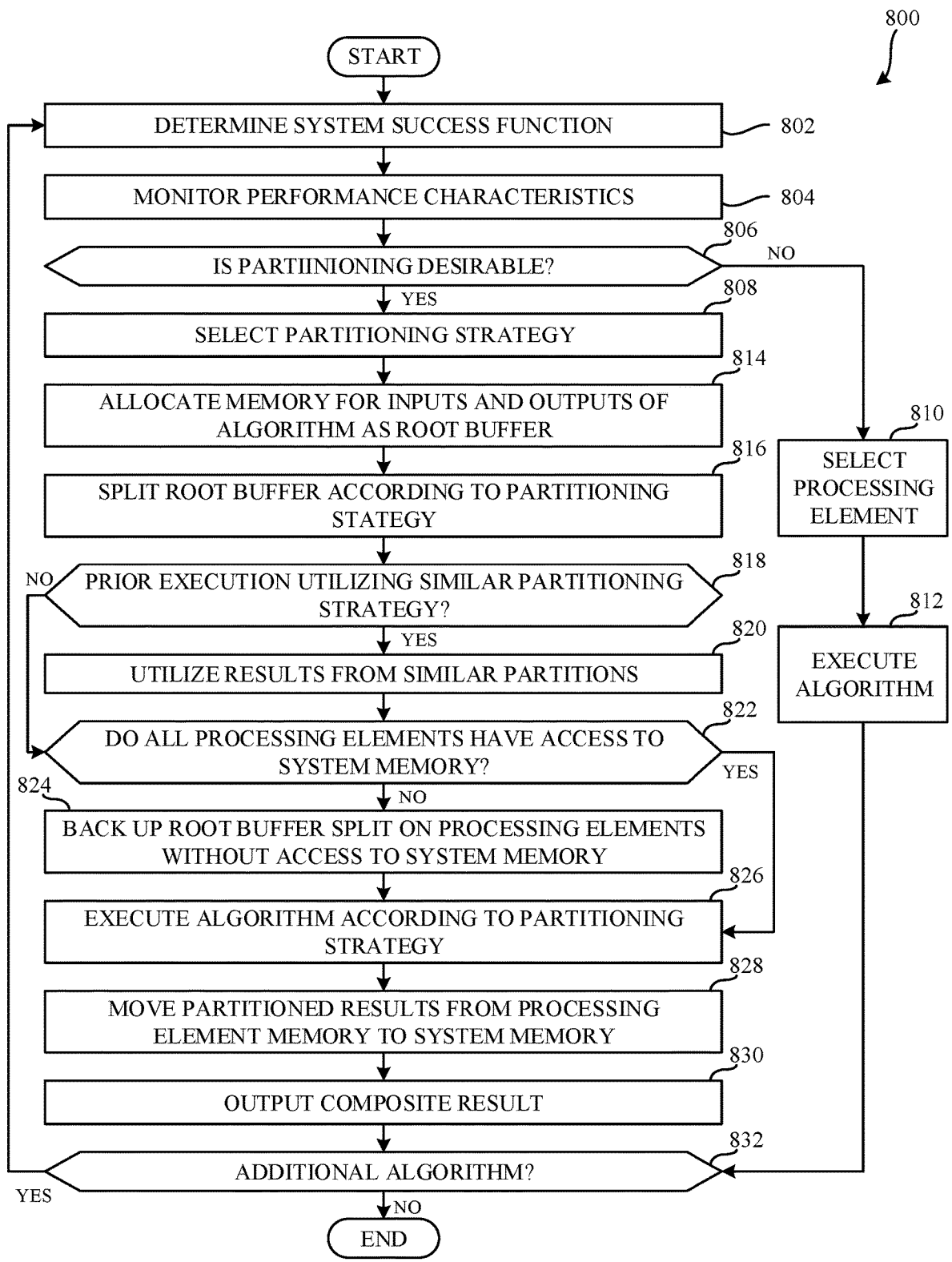
FIG. 8 is a flowchart representative of machine readable instructions which may be executed to implement the runtime scheduler of FIGS. 2 and 4 and/or more generally the executable of FIG. 2.

Additionally, a flowchart representative of example hardware logic, machine readable instructions, hardware implemented state machines, and/or any combination thereof for implementing the runtime scheduler 214 and/or more generally, the executable 208 of FIGS. 2 and 4 is shown in FIG. 8. The machine readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIG. 8, many other methods of implementing the example runtime scheduler 214 and/or more generally, the executable 208 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 7 and 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 7 is a flowchart representative of machine readable instructions 700 which may be executed to implement the variant generator 202 of FIGS. 2 and 3. The machine readable instructions 700 at block 702 where the variant manager 302 obtains one or more algorithms from a device such as an external device and/or a code developer's workstation. At block 704, the variant manager 302 determines the processing elements of a target heterogeneous system for which the algorithm has been written. At block 706, the variant manager 302 determines whether the received algorithm is a candidate for partitioning. For example, the variant manager 302 determines if the algorithm is a candidate for partitioning based on a threshold size of the input data and/or the output data.

In the example of FIG. 7, if the variant manager 302 determines that an algorithm is not a candidate for partitioning (block 706: NO), the machine readable instructions 700 proceed to block 710 where the variant manager 302 transmits the compilation auto-scheduler 306 to be subsequently processed and compiled by the variant compiler 308 into respective variants to execute the entirety of the algorithm on the respective processing elements of a heterogeneous system. After block 710, the machine readable instructions 700 proceed to block 736.

In the example of FIG. 7, if the variant manager 302 determines that an algorithm is a candidate for partitioning (block 706: YES), the algorithm partitioner 304 selects a partitioning strategy and/or partitioning strategies at block 708. The variant manager 302 may determine that an algorithm is a candidate for partitioning if the size of the input data and/or the size of the output data meets a threshold value (e.g., is greater than a threshold amount). In order to select the partitioning strategy, the example algorithm partitioner 304 utilizes one or more DNN models. After selecting a partitioning strategy, the algorithm partitioner 304 partitions the algorithm into tiles (partitions, fragments, etc.) at block 712.

In the example of FIG. 7, at block 714, the variant manager 302 selects a tile for the variant generator 202 to process. At block 716, the variant manager 302 determines whether the selected tile has the same bounds as any prior tiles that have been processed for that algorithm. If the variant manager 302 determines that the selected tile does have the same bounds a previously processed tile (block: 716: YES), the machine readable instructions 700 proceed to block 730.

In the illustrated example of FIG. 7, if variant manager 302 determines that the selected tile does not have the same bounds as a previously processed tile (block 716: NO), the variant manager 302, at block 718, selects a processing element for which the variant compiler 308 is to generate a variant of the respective tile. The variant manager 302 subsequently transmits the selected tile and an identifier of the selected processing element to the compilation auto-scheduler 306.

In the example illustrated in FIG. 7, at block 720, the compilation auto-scheduler 306 generates a schedule of the selected tile (e.g., partition, fragment, etc.) for the selected processing element received and/or otherwise obtained from the variant manager 302. At block 722, the variant compiler 308 compiles the schedule generated by the compilation auto-scheduler 306 into a variant of the selected tile capable of being executed on the selected processing element at runtime. After compiling the variant, the variant compiler 308, at block 724, adds the variant to the variant library 210 to be compiled. Additionally, at block 726, the variant compiler 308 adds a variant symbol associated with the compiled variant to the jump table 310.

In the example of FIG. 7, at block 728, the variant manager 302 determines whether there are subsequent processing elements for which to generate a variant for the selected tile. If the variant manager 302 determines that there are subsequent processing elements for which to generate a variant for the selected tile (block 728: YES), the machine readable instructions 700 proceed to block 718. If the variant manager 302 determines that there are not subsequent processing elements for which to generate a variant for the selected tile (block 728: NO), the machine readable instructions 700 proceed to block 730.

In the illustrated example of FIG. 7, at block 730, the variant manager 302 determines whether there are subsequent tiles for which to generate SAP variants. If the variant manager 302 determines that there are subsequent tiles for which to generate SAP variants (block 730: YES), the machine readable instructions 700 proceed to block 714. If the variant manager 302 determines that there are not subsequent tiles for which to generate SAP variants (block 730: NO), the machine readable instructions 700 proceed to block 732.

In the example illustrated in FIG. 7, at block 732, the variant manager 302 determines whether there are subsequent partitioning strategies by which the algorithm partitioner 304 can partition the algorithm. If the variant manager 302 determines that there are subsequent partitioning strategies by which the algorithm partitioner 304 can partition the algorithm (block 732: YES), the machine readable instructions 700 proceed to block 708. If the variant manager 302 determines that there are not subsequent partitioning strategies by which the algorithm partitioner 304 can partition the algorithm (block 732: NO), the machine readable instructions 700 proceed to block 734.

In the example of FIG. 7, at block 734, the jump table 310 adds the current state of the jump table 310 to the jump table library 212 to be compiled. At block 736, the application compiler 312 compiles the different SAP variants for the respective processing elements in the variant library 210, the variant symbols in the jump table library 212, and the runtime scheduler 214 into the executable 208.

In the example illustrated in FIG. 7, at block 738, the variant manager 302 determines whether there are additional algorithms. If there are additional algorithms (block: 738: YES), the machine readable instructions 700 proceed to block 702. If there are not additional algorithms (block: 738: NO), the machine readable instructions 700 end.

FIG. 8 is a flowchart representative of machine readable instructions which may be executed to implement the runtime scheduler 214 of FIGS. 2 and 4 and/or more generally the executable 208 of FIG. 2. The machine readable instructions 800 begin at block 802 where the workload analyzer 402 determines a success function associated with the entire performance of a given heterogeneous system. At block 804, the system profiler 404 monitors performance characteristics of the given heterogeneous system.

In the example of FIG. 8, at block 806, the workload analyzer 402 additionally determines whether partitioning is desirable for a given algorithm. If the workload analyzer 402 determines that partitioning is not desirable for a given algorithm (block 806: NO), the machine readable instruction 800 proceed to block 810 where the workload analyzer 402 selects a processing element on which to execute the entirety of a given algorithm. After block 810, the machine readable instructions 800 proceed to block 812 where the dispatcher 408 dispatches the algorithm to be executed by the selected processing element. After block 812, the machine readable instructions 800 proceed to block 832.

In the illustrated example of FIG. 8, if the workload analyzer 402 determines that partitioning is desirable (block 806: YES), the workload analyzer 402 selects a partitioning strategy at block 808. After block 808, the machine readable instructions 800 proceed to block 814. At block 814, after the workload analyzer 402 selects a partitioning strategy, the memory controller 406 allocates memory in the shared storage of the given heterogeneous system for each input and each output of the algorithm as a root buffer.

In the example of FIG. 8, after allocating the memory in the shared memory of the given heterogeneous system, the memory controller 406, at block 816, divides and/or otherwise splits the root buffer along the boundaries used in partitioning the algorithm. At block 818, the workload analyzer 402 determines whether there has been a prior execution of the algorithm utilizing a similar partitioning strategy. If the workload analyzer 402 determines that there has been a prior execution of the algorithm utilizing a similar partitioning strategy (block 818: YES), the workload analyzer 402 utilizes the results of the similar SAP variants already determined in the prior execution at block 820. After block 820, the machine readable instruction 800 proceed to block 822.

In the example illustrated in FIG. 8, if the workload analyzer 402 determines that there has not been a prior execution of the algorithm utilizing a similar partitioning strategy (block 818: NO), the machine readable instructions 800 proceed to block 822. At block 822, the memory controller 406 determines whether the processing elements selected for the partitioning strategy have access to the shared memory of the given heterogeneous system.

In the example of FIG. 8, if the memory controller 406 determines that some of the processing elements selected for the partitioning strategy do not have access to the shared memory of the heterogeneous system (block 822: NO), the memory controller 406 backs up the partitioning splits of the root buffer on the respective memories of the processing elements associated with the partitioning splits at block 824. After block 824, the machine readable instructions 800 proceed to block 826. If the memory controller 406 determines that all of the processing elements selected for the partitioning strategy have access to the shared memory of the heterogeneous system (block 822: YES), the machine readable instructions 800 proceed to block 826.

In the example illustrated in FIG. 8, at block 826, the dispatch 408 dispatches the algorithm partition variants (e.g., SAP variants) to their respective processing elements to be executed. At block 828, after the various SAP variants have finished executing, the memory controller 406 moves the results of the algorithm partition variants on processing element specific memory, if any, to the shared memory of the given heterogeneous system.

In the example of FIG. 8, at block 830, the workload analyzer 402 then outputs the composite result of the partitioned algorithm for use. At block 832, the workload analyzer 402 determines whether there are additional algorithms. If there are additional algorithms (block: 832: YES), the machine readable instructions 800 proceed to block 802. If there are not additional algorithms (block: 832: NO), the machine readable instructions 800 end.

Figure 9:
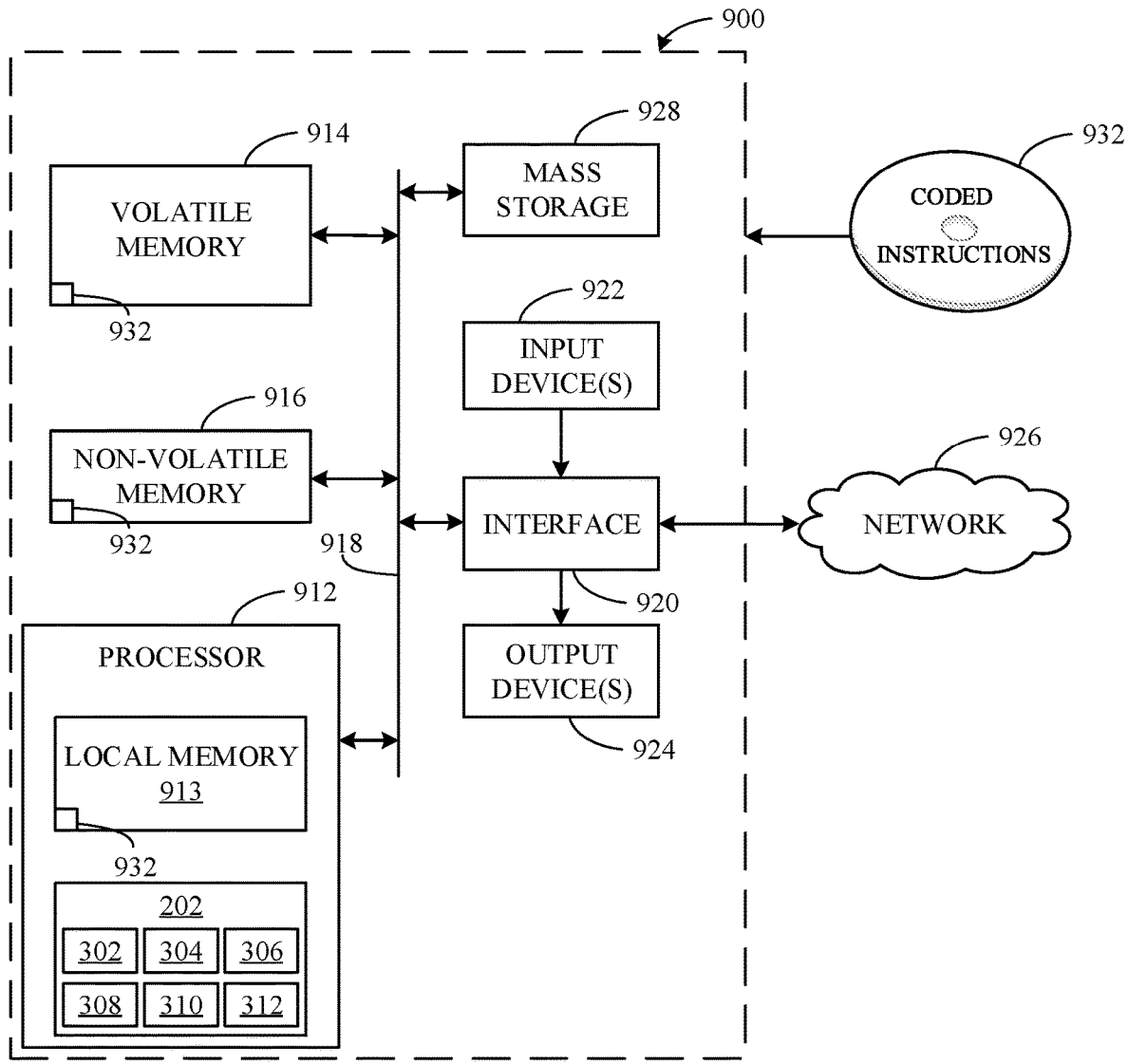
FIG. 9 is a block diagram of an example processing platform structured to execute the instructions of FIG. 7 to implement the variant generator of FIGS. 2 and 3.

FIG. 9 is a block diagram of an example processor platform 900 structured to execute the instructions of FIG. 7 to implement the variant generator 202 of FIGS. 2 and 3. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example variant manager 302, the example algorithm partitioner 304, the example compilation auto-scheduler 306, the example variant compiler 308, the example jump table 310, and the example application compiler 312.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 7 may be stored in the mass storage device 928, in the volatile memory 914, in the non-volatile memory 916, and/or on a removable non-transitory computer readable storage medium such as a CD or DVD.

Figure 10:
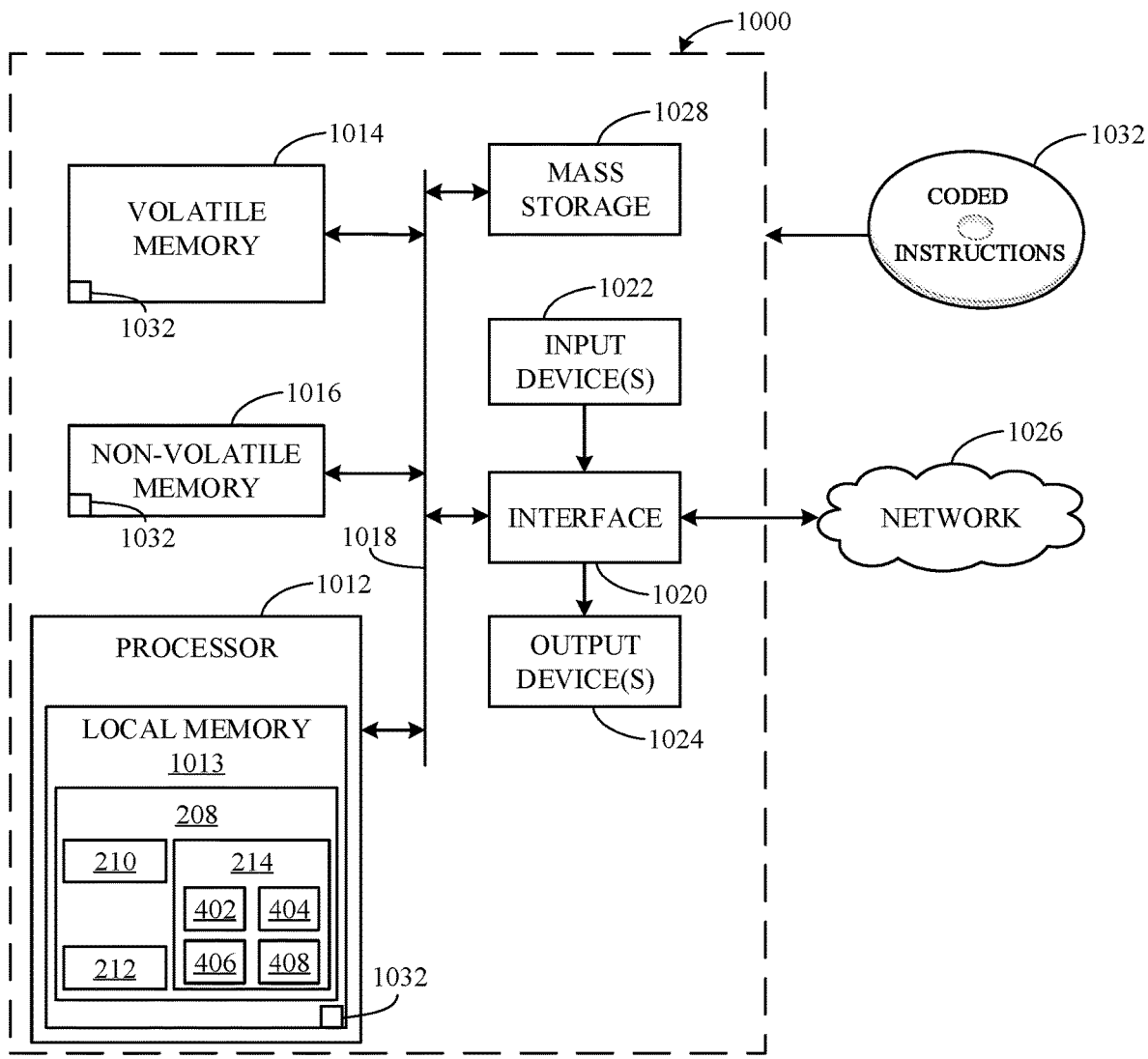
FIG. 10 is a block diagram of an example processing platform structured to execute the instructions of FIG. 8 to implement the runtime scheduler of FIGS. 2 and 4 and/or more generally, the executable of FIG. 2.

FIG. 10 is a block diagram of an example processor platform 1000 structured to execute the instructions of FIG. 8 to implement the runtime scheduler 214 and/or more generally, the executable 208 of FIGS. 2 and 4. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. Additionally, the processor platform 1000 may include additional processing elements such as, the example CPU 216, the example FPGA 218, the example VPU 220, and the example GPU 222.

The processor 1012 of the illustrated example includes a local memory 1013 (e.g., a cache). In this example, the local memory 1013 includes the example variant library 210, the example jump table library 212, the example workload analyzer 402, the example system profiler 404, the example memory controller 406, the example dispatcher 408, and/or, more generally, the example runtime scheduler 214, and/or more generally the example executable 208. The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIG. 8 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that improve the utilization of a heterogeneous system executing software. Moreover, the examples disclosed herein decompose algorithms within a workload into smaller fragments (e.g., tiles, partitions, etc.) than can be scheduled at runtime to efficiently utilize the available processing resources of a heterogeneous system while improving the execution of such an algorithm by parallelizing the execution of the various fragments. Examples disclosed herein include determining whether SAP should be applied to an algorithm, partitioning the algorithm into SAP tiles (e.g., fragments, partitions, etc.), generating processing elements specific variants for each tile, ensuring that data produced by all fragments efficiently collates into a single result, the runtime selection of variants of fragments, and the coordination of workload offloading during runtime.

The disclosed methods, apparatus and articles of manufacture improve the efficiency of using a computing device by reducing the number of computational cycles needed to execute a workload and increasing the utilization of various heterogeneous processing elements to execute an algorithm. The disclosed methods, apparatus and articles of manufacture are accordingly directed to one or more improvement(s) in the functioning of a computer.

Example methods, apparatus, systems, and articles of manufacture to improve utilization of a heterogeneous system executing software are disclosed herein. Further examples and combinations thereof include the following:

Example 1 includes an apparatus to improve utilization of a heterogeneous system executing software, the apparatus comprising a variant manager to determine whether an algorithm is a candidate for sub-algorithmic partitioning (SAP) based on at least one of a first size of input data to the algorithm and a second size of output data from the algorithm, a partitioner to partition the algorithm into at least a first tile and a second tile, and a compiler to compile a first variant based on the first tile and a second variant based on the second tile into an executable file, the first variant to be executed on a first processing element of the heterogeneous system, the second variant to be executed on a second processing element of the heterogeneous system.

Example 2 includes the apparatus of example 1, wherein when at least one of the first size and the second size meet a threshold value, the variant manager is to determine that the algorithm is a candidate for SAP.

Example 3 includes the apparatus of example 1, wherein the partitioner is to partition the algorithm into at least the first tile and the second tile based on a deep neural network.

Example 4 includes the apparatus of example 1, wherein the partitioner is to generate the first tile and the second tile based on a first partitioning strategy, the partitioner to generate a third tile and a fourth tile based on a second partitioning strategy different than the first partitioning strategy.

Example 5 includes the apparatus of example 4, wherein the first tile includes a first buffer associated with at least a set of input data to the algorithm, and wherein when the third tile includes a second buffer with at least the set of input data to the algorithm, the first variant is to be executed on the first processing element to implement the third tile.

Example 6 includes the apparatus of example 1, wherein the first tile includes a first buffer associated with at least a first set of input data to the algorithm and the second tile includes a second buffer associated with at least a second set of input data to the algorithm, the second set of input data larger than the first set of input data.

Example 7 includes the apparatus of example 1, wherein the variant manager is to determine that the heterogeneous system includes the first processing element and the second processing element.

Example 8 includes a non-transitory computer readable storage medium comprising instructions which, when executed, cause at least one processor to at least determine whether an algorithm is a candidate for sub-algorithmic partitioning (SAP) based on at least one of a first size of input data to the algorithm and a second size of output data from the algorithm, partition the algorithm into at least a first tile and a second tile, and compile a first variant based on the first tile and a second variant based on the second tile into an executable file, the first variant to be executed on a first processing element of a heterogeneous system, the second variant to be executed on a second processing element of the heterogeneous system.

Example 9 includes the non-transitory computer readable storage medium of example 8, wherein the instructions, when executed, cause the at least one processor to, when at least one of the first size and the second size meet a threshold value, determine that the algorithm is a candidate for SAP.

Example 10 includes the non-transitory computer readable storage medium of example 8, wherein the instructions, when executed, cause the at least one processor to partition the algorithm into at least the first tile and the second tile based on a deep neural network.

Example 11 includes the non-transitory computer readable storage medium of example 8, wherein the instructions, when executed, cause the at least one processor to generate the first tile and the second tile based on a first partitioning strategy and a third tile and a fourth tile based on a second partitioning strategy different than the first partitioning strategy.

Example 12 includes the non-transitory computer readable storage medium of example 11, wherein the first tile includes a first buffer associated with at least a set of input data to the algorithm, and wherein when the third tile includes a second buffer with at least the set of input data to the algorithm, the first variant is to be executed on the first processing element to implement the third tile.

Example 13 includes the non-transitory computer readable storage medium of example 8, wherein the first tile includes a first buffer associated with at least a first set of input data to the algorithm and the second tile includes a second buffer associated with at least a second set of input data to the algorithm, the second set of input data larger than the first set of input data.

Example 14 includes the non-transitory computer readable storage medium of example 8, wherein the instructions, when executed, cause the at least one processor to determine that the heterogeneous system includes the first processing element and the second processing element.

Example 15 includes an apparatus to improve utilization of a heterogeneous system executing software, the apparatus comprising means for managing, the means for managing to determine whether an algorithm is a candidate for sub-algorithmic partitioning (SAP) based on at least one of a first size of input data to the algorithm and a second size of output data from the algorithm, means for partitioning, the means for partitioning to partition the algorithm into at least a first tile and a second tile, and means for compiling, the means for compiling to compile a first variant based on the first tile and a second variant based on the second tile into an executable file, the first variant to be executed on a first processing element of the heterogeneous system, the second variant to be executed on a second processing element of the heterogeneous system.

Example 16 includes the apparatus of example 15, wherein when at least one of the first size and the second size meet a threshold value, the means for managing is to determine that the algorithm is a candidate for SAP.

Example 17 includes the apparatus of example 15, wherein the means for partitioning is to partition the algorithm into at least the first tile and the second tile based on a deep neural network.

Example 18 includes the apparatus of example 15, wherein the means for partitioning is to generate the first tile and the second tile based on a first partitioning strategy and a third tile and a fourth tile based on a second partitioning strategy different than the first partitioning strategy.

Example 19 includes the apparatus of example 18, wherein the first tile includes a first buffer associated with at least a set of input data to the algorithm, and wherein when the third tile includes a second buffer with at least the set of input data to the algorithm, the first variant is to be executed on the first processing element to implement the third tile.

Example 20 includes the apparatus of example 15, wherein the first tile includes a first buffer associated with at least a first set of input data to the algorithm and the second tile includes a second buffer associated with at least a second set of input data to the algorithm, the second set of input data larger than the first set of input data.

Example 21 includes the apparatus of example 1, wherein the means for managing is to determine that the heterogeneous system includes the first processing element and the second processing element.

Example 22 includes a method to improve utilization of a heterogeneous system executing software, the method comprising determining whether an algorithm is a candidate for sub-algorithmic partitioning (SAP) based on at least one of a first size of input data to the algorithm and a second size of output data from the algorithm, partitioning the algorithm into at least a first tile and a second tile, and compiling a first variant based on the first tile and a second variant based on the second tile into an executable file, the first variant to be executed on a first processing element of a heterogeneous system, the second variant to be executed on a second processing element of the heterogeneous system.

Example 23 includes the method of example 22, further including determining that the algorithm is a candidate for SAP when at least one of the first size and the second size meet a threshold value.

Example 24 includes the method of example 22, further including partitioning the algorithm into at least the first tile and the second tile based on a deep neural network.

Example 25 includes the method of example 23, further including generating the first tile and the second tile based on a first partitioning strategy and a third tile and a fourth tile based on a second partitioning strategy different than the first partitioning strategy.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to improve utilization of a heterogeneous system executing software, the apparatus comprising:
   a variant manager to determine whether an algorithm is a candidate for sub-algorithmic partitioning (SAP) based on at least one of a first size of input data to the algorithm or a second size of output data from the algorithm;
   a partitioner to partition the algorithm into at least a first tile and a second tile;
   a compiler to compile first and second variants of the first tile and third and fourth variants of the second tile into an executable file, the first, second, third, and fourth variants written in respective languages for execution on respective processing elements, at least one of the first or second variants to be executed on first or second processing elements of the heterogeneous system, respectively, based on performance characteristics of the heterogeneous system at runtime, and at least one of the third or fourth variants to be executed on the first or second processing elements of the heterogeneous system, respectively, based on the performance characteristics of the heterogeneous system at runtime; and
   at least one hardware logic or logic circuit to implement at least one of the variant manager, the partitioner, or the compiler.

2. The apparatus of claim 1, wherein when at least one of the first size and the second size meet a threshold value, the variant manager is to determine that the algorithm is the candidate for SAP.

3. The apparatus of claim 1, wherein the partitioner is to partition the algorithm into at least the first tile and the second tile based on a deep neural network.

4. The apparatus of claim 1, wherein the partitioner is to:
   generate the first tile and the second tile based on a first partitioning strategy; and
   generate a third tile and a fourth tile based on a second partitioning strategy different than the first partitioning strategy.

5. The apparatus of claim 4, wherein the first tile includes a first buffer associated with at least a set of input data to the algorithm, and when the third tile includes a second buffer with at least the set of input data to the algorithm, the first variant or the second variant is to be executed on the first processing element or the second processing element, respectively, to implement the third tile.

6. The apparatus of claim 1, wherein the first tile includes a first buffer associated with at least a first set of input data to the algorithm and the second tile includes a second buffer associated with at least a second set of input data to the algorithm, the second set of input data larger than the first set of input data.

7. The apparatus of claim 1, wherein the variant manager is to determine that the heterogeneous system includes the first processing element and the second processing element.

8. A non-transitory computer readable storage medium comprising instructions which, when executed, cause at least one processor to at least:
   determine whether an algorithm is a candidate for sub-algorithmic partitioning (SAP) based on at least one of a first size of input data to the algorithm and a second size of output data from the algorithm;
   partition the algorithm into at least a first tile and a second tile; and
   compile first and second variants of the first tile and third and fourth variants of the second tile into an executable file, the first, second, third, and fourth variants written in respective languages for execution on respective processing elements, at least one of the first or second variants to be executed on first or second processing elements of a heterogeneous system, respectively, based on performance characteristics of the heterogenous system at runtime, and at least one of the third or fourth variants to be executed on the first or second processing elements of the heterogeneous system, respectively, based on the performance characteristics of the heterogeneous system at runtime.

9. The non-transitory computer readable storage medium of claim 8, wherein the instructions, when executed, cause the at least one processor to, when at least one of the first size and the second size meet a threshold value, determine that the algorithm is the candidate for SAP.

10. The non-transitory computer readable storage medium of claim 8, wherein the instructions, when executed, cause the at least one processor to partition the algorithm into at least the first tile and the second tile based on a deep neural network.

11. The non-transitory computer readable storage medium of claim 8, wherein the instructions, when executed, cause the at least one processor to:
   generate the first tile and the second tile based on a first partitioning strategy; and
   generate a third tile and a fourth tile based on a second partitioning strategy different than the first partitioning strategy.

12. The non-transitory computer readable storage medium of claim 11, wherein the first tile includes a first buffer associated with at least a set of input data to the algorithm, and when the third tile includes a second buffer with at least the set of input data to the algorithm, the first variant or the second variant is to be executed on the first processing element or the second processing element, respectively, to implement the third tile.

13. The non-transitory computer readable storage medium of claim 8, wherein the first tile includes a first buffer associated with at least a first set of input data to the algorithm and the second tile includes a second buffer associated with at least a second set of input data to the algorithm, the second set of input data larger than the first set of input data.

14. The non-transitory computer readable storage medium of claim 8, wherein the instructions, when executed, cause the at least one processor to determine that the heterogeneous system includes the first processing element and the second processing element.

15. An apparatus to improve utilization of a heterogeneous system executing software, the apparatus comprising:
means for managing, the means for managing to determine whether an algorithm is a candidate for sub-algorithmic partitioning (SAP) based on at least one of a first size of input data to the algorithm and a second size of output data from the algorithm;
means for partitioning, the means for partitioning to partition the algorithm into at least a first tile and a second tile; and
means for compiling, the means for compiling to compile first and second variants of the first tile and third and fourth variants of the second tile into an executable file, the first, second, third, and fourth variants written in respective languages for execution on respective processing elements, at least one of the first or second variants to be executed on first or second processing elements of the heterogeneous system, respectively, based on performance characteristics of the heterogenous system at runtime, and at least one of the third or fourth variants to be executed on the first or second processing elements of the heterogeneous system, respectively, based on the performance characteristics of the heterogeneous system at runtime.

16. The apparatus of claim 15, wherein when at least one of the first size and the second size meet a threshold value, the means for managing is to determine that the algorithm is the candidate for SAP.

17. The apparatus of claim 15, wherein the means for partitioning is to partition the algorithm into at least the first tile and the second tile based on a deep neural network.

18. The apparatus of claim 15, wherein the means for partitioning is to:
generate the first tile and the second tile based on a first partitioning strategy; and
generate a third tile and a fourth tile based on a second partitioning strategy different than the first partitioning strategy.

19. The apparatus of claim 18, wherein the first tile includes a first buffer associated with at least a set of input data to the algorithm, and when the third tile includes a second buffer with at least the set of input data to the algorithm, the first variant or the second variant is to be executed on the first processing element or the second processing element, respectively, to implement the third tile.

20. The apparatus of claim 15, wherein the first tile includes a first buffer associated with at least a first set of input data to the algorithm and the second tile includes a second buffer associated with at least a second set of input data to the algorithm, the second set of input data larger than the first set of input data.

21. The apparatus of claim 15, wherein the means for managing is to determine that the heterogeneous system includes the first processing element and the second processing element.

22. A method to improve utilization of a heterogeneous system executing software, the method comprising:
determining whether an algorithm is a candidate for sub-algorithmic partitioning (SAP) based on at least one of a first size of input data to the algorithm and a second size of output data from the algorithm;
partitioning the algorithm into at least a first tile and a second tile; and
compiling first and second variants of the first tile and third and fourth variants of the second tile into an executable file, the first, second, third, and fourth variants written in respective languages for execution on respective processing elements, at least one of the first or second variants to be executed on first or second processing elements of the heterogeneous system, respectively, based on performance characteristics of the heterogenous system at runtime, and at least one of the third or fourth variants to be executed on the first or second processing elements of the heterogeneous system, respectively, based on the performance characteristics of the heterogeneous system at runtime.

23. The method of claim 22, further including determining that the algorithm is the candidate for SAP when at least one of the first size and the second size meet a threshold value.

24. The method of claim 22, further including partitioning the algorithm into at least the first tile and the second tile based on a deep neural network.

25. The method of claim 22, further including:
generating the first tile and the second tile based on a first partitioning strategy: and generating a third tile and a fourth tile based on a second partitioning strategy different than the first partitioning strategy.

26. An apparatus to improve utilization of a heterogeneous system executing software, the apparatus comprising:
at least one non-transitory computer readable medium comprising instructions; and
a processor programmed to execute the instructions to:
determine whether an algorithm is a candidate for sub-algorithmic partitioning (SAP) based on at least one of a first size of input data to the algorithm and a second size of output data from the algorithm;
partition the algorithm into at least a first tile and a second tile; and
compile first and second variants of the first tile and third and fourth variants of the second tile into an executable file, the first, second, third, and fourth variants written in respective languages for execution on respective processing elements, at least one of the first or second variants to be executed on first or second processing elements of the heterogeneous system, respectively, based on performance characteristics of the heterogenous system at runtime, and at least one of the third or fourth variants to be executed on the first or second processing elements of the heterogeneous system, respectively, based on the performance characteristics of the heterogeneous system at runtime.

27. The apparatus of claim 26, wherein the at least one processor is to execute the instructions to, when at least one of the first size and the second size meet a threshold value, determine that the algorithm is the candidate for SAP.

28. The apparatus of claim 26, wherein the at least one processor is to execute the instructions to partition the algorithm into at least the first tile and the second tile based on a deep neural network.

29. The apparatus of claim 26, wherein the at least one processor is to execute the instructions to:
generate the first tile and the second tile based on a first partitioning strategy; and
generate a third tile and a fourth tile based on a second partitioning strategy different than the first partitioning strategy.

30. The apparatus of claim 29, wherein the first tile includes a first buffer associated with at least a set of input data to the algorithm, and when the third tile includes a second buffer with at least the set of input data to the algorithm, the first variant or the second variant is to be executed on the first processing element or the second processing element, respectively, to implement the third tile.

31. The apparatus of claim 26, wherein the first tile includes a first buffer associated with at least a first set of input data to the algorithm and the second tile includes a second buffer associated with at least a second set of input data to the algorithm, the second set of input data larger than the first set of input data.

32. The apparatus of claim 26, wherein the at least one processor is to execute the instructions to determine that the heterogeneous system includes the first processing element and the second processing element.

* * * * *